(12) United States Patent
Teranishi

(10) Patent No.: US 10,409,431 B2
(45) Date of Patent: Sep. 10, 2019

(54) INPUT DEVICE AND DISPLAY DEVICE

(71) Applicant: Japan Display Inc., Tokyo (JP)

(72) Inventor: Yasuyuki Teranishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 24 days.

(21) Appl. No.: 15/410,656

(22) Filed: Jan. 19, 2017

(65) Prior Publication Data

US 2017/0212618 A1     Jul. 27, 2017

(30) Foreign Application Priority Data

Jan. 22, 2016 (JP) ................. 2016-010422

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01); *G09G 2310/0205* (2013.01)

(58) Field of Classification Search
CPC ...... G06F 3/044; G06F 3/0412; G06F 3/0416; G06F 2203/04106; G06F 2203/04103; G06F 3/041; G06F 1/3262
See application file for complete search history.

(56) References Cited

U.S. PATENT DOCUMENTS

| | | | |
|---|---|---|---|
| 8,237,453 B2 | 8/2012 | Badaye et al. | |
| 9,092,087 B2* | 7/2015 | Ishizaki | G06F 3/0412 |
| 9,274,653 B2 | 3/2016 | Ishizaki et al. | |
| 9,823,784 B2* | 11/2017 | Sleeman | G01D 5/2405 |
| 2008/0158167 A1* | 7/2008 | Hotelling | G06F 3/0416 345/173 |
| 2010/0328274 A1* | 12/2010 | Noguchi | G02F 1/13338 345/204 |
| 2011/0199324 A1* | 8/2011 | Wang | G06F 3/0412 345/173 |
| 2011/0247884 A1* | 10/2011 | Kim | G06F 3/044 178/18.03 |

(Continued)

FOREIGN PATENT DOCUMENTS

JP 2011-013757 A 1/2011

OTHER PUBLICATIONS

Japanese Office Action dated Jun. 11, 2019, for corresponding Japan Patent Application No. 2016-010422.

*Primary Examiner* — Sanjiv D. Patel
(74) *Attorney, Agent, or Firm* — Michael Best & Friedrich LLP

(57) ABSTRACT

An input device includes a plurality of first electrodes each extending in a first direction and arrayed along a second direction crossing the first direction at a first separation distance, and a detection unit configured to detect an output signal based on electrostatic capacitance of each of the plurality of first electrodes. In addition, each of the plurality of first electrodes includes a plurality of electrode portions each extending along the first direction, and a joining portion connecting the plurality of electrode portions with each other. Moreover, when seen in a plan view, each of the plurality of electrode portions connected to the joining portion is arrayed along the second direction at a second separation distance, and the first separation distance is smaller than the second separation distance.

16 Claims, 20 Drawing Sheets

(56) References Cited

U.S. PATENT DOCUMENTS

| | | | |
|---|---|---|---|
| 2013/0016065 A1 | 1/2013 | Reynolds et al. | |
| 2013/0050108 A1* | 2/2013 | Hong | G06F 3/0416 345/173 |
| 2013/0181940 A1* | 7/2013 | Lai | G06F 3/044 345/174 |
| 2014/0210772 A1* | 7/2014 | Yang | G06F 1/3262 345/174 |
| 2014/0240110 A1* | 8/2014 | Suzuki | G06F 3/041 340/407.1 |
| 2018/0188842 A1* | 7/2018 | Kwon | G06F 3/044 |

\* cited by examiner

INPUT DEVICE AND DISPLAY DEVICE

CROSS-REFERENCE TO RELATED APPLICATION

The present application claims priority from Japanese Patent Application No. 2016-10422 filed on Jan. 22, 2016, the content of which is hereby incorporated by reference into this application.

TECHNICAL FIELD OF THE INVENTION

The present invention relates to an input device and a display device provided with the input device, and more specifically, to an electrostatic capacitance type input device.

BACKGROUND OF THE INVENTION

In recent years, there is a technique for mounting an input device referred to as a touch panel or a touch sensor on a display device on a display surface side thereof and for detecting and outputting an input position of an input tool when input operation is performed in which the input tool such as a finger and a touch pen (also referred to as a stylus pen) or the like contacts the touch panel. The display device having such touch panel is widely used not only in a computer but also in a portable information terminal such as a cellular phone and the like.

As one of detection methods for detecting a contact position where the finger or the like contacts the touch panel, there is an electrostatic capacitance type detection method. An electrostatic capacitance type touch panel is configured, for example, as the following. That is, within a screen of the touch panel, there is provided a plurality of capacitance elements constituted of a pair of electrodes, which are, for example, a driving electrode and a detection electrode disposed opposite to each other interposing a dielectric layer. Then, when the input operation is performed in which the input tool such as the finger and the touch pen contacts the capacitance elements, electrostatic capacitance of the capacitance elements changes. By using this change, the input position is detected.

In a method for detecting a position of an input tool by disposing a plurality of electrodes within a screen of the touch panel and by using a change in electrostatic capacitance of a part of the plurality of electrodes caused by approaching the input tool to a part of the electrodes, an arrangement interval of the plurality of electrodes greatly affects accuracy of position detection. In particular, in a case where the input tool has a small area, output of a position detection signal tends to be small at a boundary between adjacent electrodes. In a case where the output of the position detection signal is small, it may cause a reduction of detection sensitivity or an erroneous detection of the position.

On the other hand, in a case where the arrangement interval of the plurality of electrodes is narrowed, an arrangement density of the electrodes disposed within a detection range increases. This may lead to a decreased visibility of a display image. Moreover, an increase of the number of detection circuits connected to a position detection electrode is a factor of hindering downsizing of a display device. The increase of the number of detection circuits increases a probability of failure of a part of the increased number of detection circuits.

SUMMARY OF THE INVENTION

An objective of the present invention is to provide a technique for improving reliability of an input device.

The typical ones of the inventions disclosed in the present application will be briefly described as follows.

An input device as an aspect of the present invention includes: a plurality of first electrodes each extending in a first direction and arrayed along a second direction crossing the first direction at a first separation distance; and a detection unit configured to detect an output signal based on electrostatic capacitance of each of the plurality of first electrodes. Each of the plurality of first electrodes includes: a plurality of electrode portions each extending along the first direction; and a joining portion connecting the plurality of electrode portions with each other. In a plan view, each of the plurality of electrode portions connected to the joining portion is arrayed at a second separation distance along a second direction and the first separation distance is smaller than the second separation distance.

A display device as an aspect of the present invention includes: a first substrate; a pixel group constituted of a plurality of pixels provided to the first substrate; a plurality of first electrodes each overlapping with the pixel group in a plan view; and a detection unit configured to detect an output signal based on electrostatic capacitance of each of the plurality of first electrodes. Each of the plurality of first electrodes extends in a first direction and is arrayed along a second direction crossing the first direction at a first separation distance in a plan view. Each of the plurality of first electrodes includes: a plurality of electrode portions each extending along the first direction and arrayed along the second direction at a second separation distance; and a first joining portion connecting the plurality of electrode portions with each other. Each of the plurality of electrode portions connected to the first joining portion is arrayed along the second direction at the second separation distance in a plan view, and the first separation distance is smaller than the second separation distance.

BRIEF DESCRIPTIONS OF THE DRAWINGS

DESCRIPTIONS OF THE PREFERRED EMBODIMENTS

Figure 1:
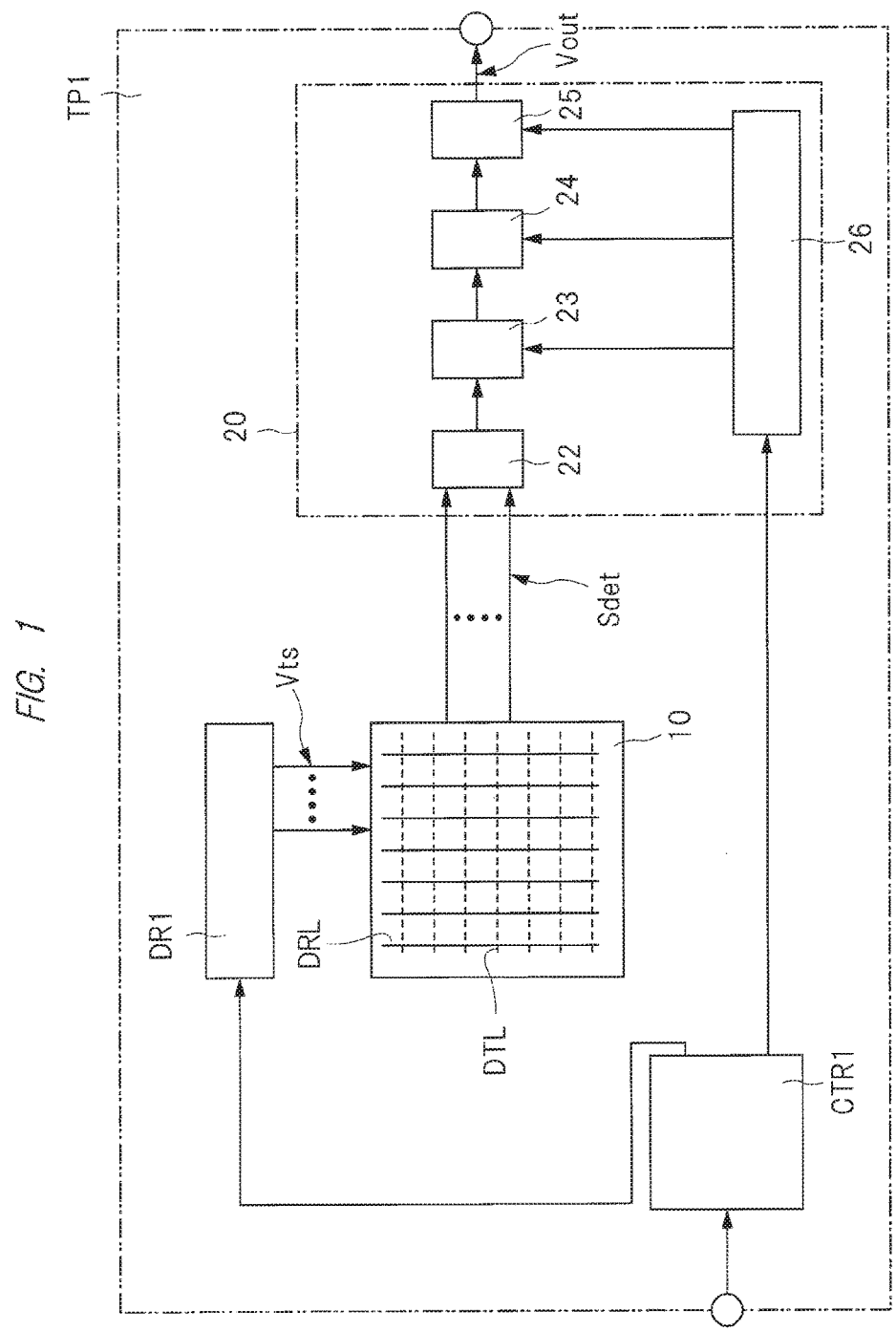
FIG. 1 is a block diagram illustrating an exemplary configuration of an input device according to a first embodiment.

Each embodiment of the present invention will be described below with reference to the drawings.

Note that this disclosure is an example only and suitable modifications which can be easily conceived by those skilled in the art without departing from the gist of the present invention are included within the scope of the invention as a matter of course. In addition, in order to further clarify the description, a width, a thickness, a shape, and the like of respective portions may be schematically illustrated in the drawings as compared to aspects of the embodiments, but they are examples only and do not limit the interpretation of the present invention.

In addition, in this specification and the respective drawings, the same components described in the drawings which have been described before are denoted by the same reference characters, and detailed description thereof may be omitted as needed.

Further, hatching which is applied in order to distinguish a structure is sometimes omitted in the drawings used in the embodiments depending on the drawing.

In the present application, an input device means a device that detects a signal, which is input from the outside. In the present specification, there is described an input device of an electrostatic capacitance detection type that detects an input signal by detecting electrostatic capacitance that changes according to capacitance of an object approaching or in contact with an electrode.

Among the electrostatic capacitance detection types, there is a mutual capacitance type in which electrostatic capacitance between two electrodes, which are disposed opposite to each other and separate from each other, is detected. Among the electrostatic capacitance detection types, there is also a self-capacitance type in which electrostatic capacitance of one electrode is detected. Although it has been described above that the electrostatic capacitance of the one electrode is detected in the self-capacitance type, more specifically, the electrostatic capacitance between the one electrode and a reference potential such as a ground potential is detected. In the self-capacitance type, a part supplied with the reference potential is a conductor pattern disposed around the electrode at a separation distance to a degree where electrostatic capacitance that is detectable can be formed with the electrode. As long as a supply channel of a fixed potential is connected, a shape thereof is not particularly limited.

A touch panel is one aspect of the input device, and it is the input device that, when input operation is performed by bringing an input tool such as a finger and a touch pen approaching or in contact with the touch panel, detects an input signal while calculating and outputting a touch position thereof. In other words, the touch position is a coordinate of a position where the input signal is detected on a coordinate plane for detecting the input signal.

The input device such as the touch panel that calculates the touch position is often used in combination with a display device. In the present application, a display device with an input function, in which components assembled into the display device are independent from components assembled into the input device as well as the display device and the input device are used in a mutually overlapping state, is referred to as an external type or on-cell type display device. The display device with the input function used in a state where all or part of components constituting an input detection unit, which detects the input signal, are incorporated between components constituting a display unit, which displays an image, is referred to as a built-in type or an in-cell type display device. The in-cell type display device includes the display device in which all or part of components constituting the input detection unit are also used as all or part of components constituting the display unit.

The in-cell type display device has the display device in which the components constituting the input detection unit and the components constituting the display unit are not shared therebetween.

First Embodiment

The technique described below is applicable to the input device provided to the on-cell type display device and the in-cell type display device. In this embodiment, to make operation of the input device easy to understand, there is described the example of the technique according to a part of the input device provided to the on-cell type display device. Among the electrostatic capacitance type input devices, an aspect applied to the input device of the mutual capacitance type is described in this embodiment while an aspect applied to the input device of the self-capacitance type is described as a modification.

<An Operation Principle of the Input Device of the Electrostatic Capacitance Detection Type>

Figure 2:
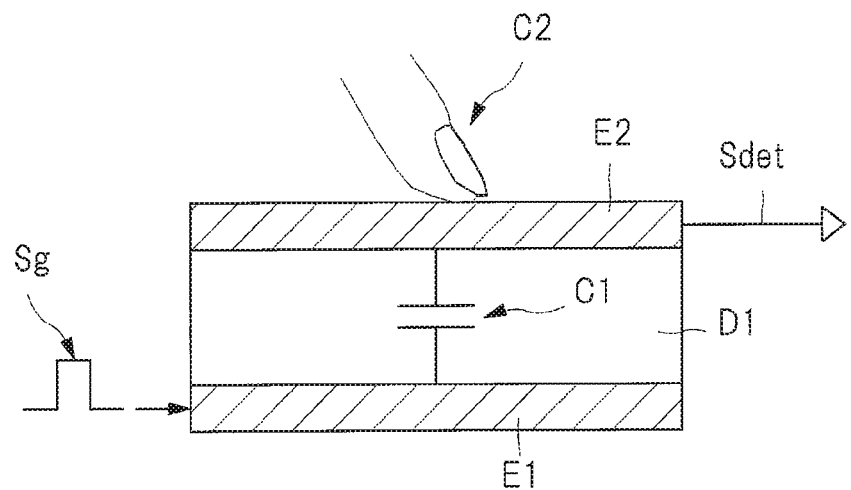
FIG. 2 is an explanatory drawing illustrating a state in which a finger is in contact with or approaching the input device.
Figure 3:
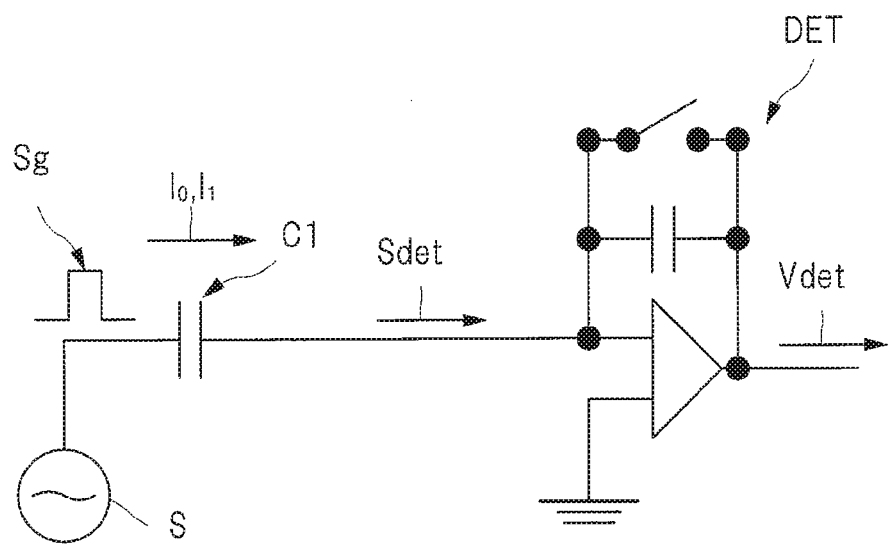
FIG. 3 is an explanatory drawing illustrating an exemplary equivalent circuit in a state in which the finger is in contact with or approaching the input device.
Figure 4:
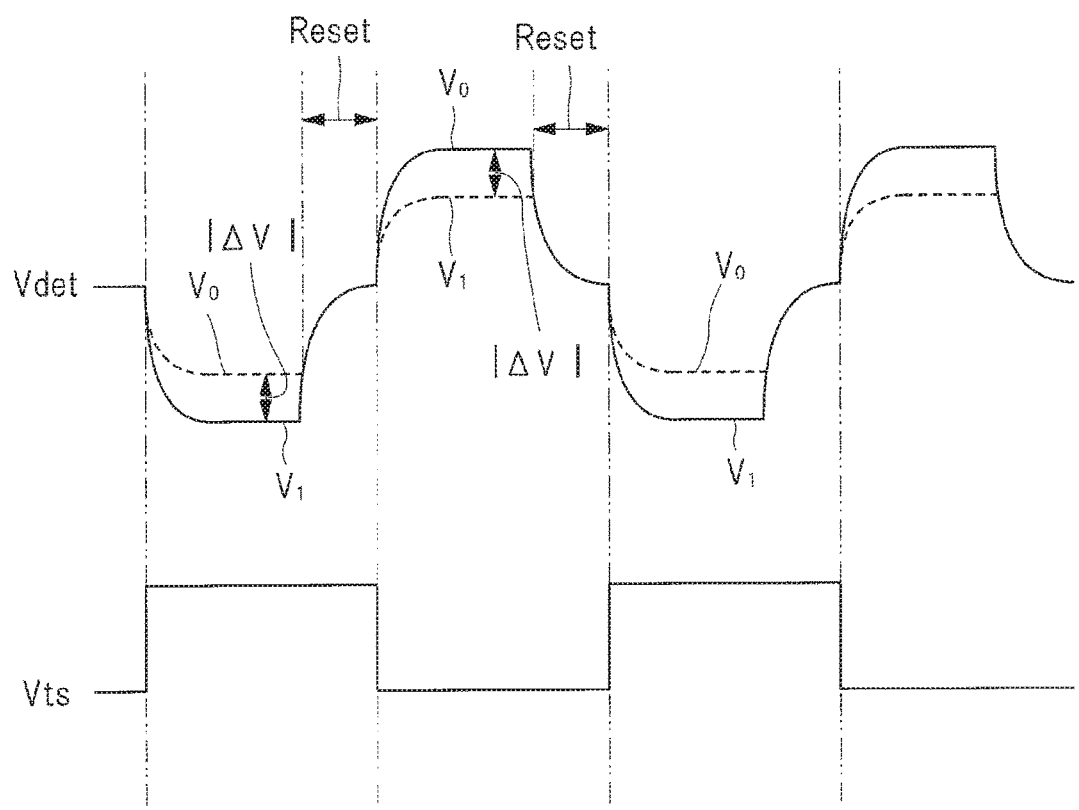
FIG. 4 is a graph illustrating an exemplary waveform of a driving signal and a detection signal.

First, with reference to FIGS. 1 to 4, there is described a principle of input detection by an input device TP1 according to the first embodiment. FIG. 1 is a block diagram illustrating an exemplary configuration of the input device according to the first embodiment. FIG. 2 is an explanatory drawing illustrating a state in which a finger is in contact with or approaching the input device. FIG. 3 is an explanatory drawing illustrating an exemplary equivalent circuit in a state in which the finger is in contact with or approaching the input device. FIG. 4 is a graph illustrating an exemplary waveform of a driving signal and a detection signal.

Note that in the present specification, "approaching" means a state in which the input tool such as the finger contacts a part of the input device or a state in which the input tool is not in contact with, but is brought close enough to, the input device such that intensity of a detection signal is greater than or equal to a predetermined threshold.

As illustrated in FIG. 1, the input device TP1 according to this embodiment includes an input detection unit 10 that outputs an input signal as a detection signal Sdet, and a detection circuit portion 20 that implements signal processing on the detection signal Sdet in the input detection unit 10 and calculates a position coordinate that is input. The input device TP1 also includes a control unit CTR1 provided with a control circuit for controlling the input detection unit 10 and the detection circuit portion 20, and an input detection driver DR1 as a driving unit having a driving circuit that supplies a driving signal Vts to the input detection unit 10. In FIG. 1, among a plurality of electrodes provided to the input detection unit 10, a driving electrode DRL is schematically illustrated with a solid line, and a detection electrode DTL is schematically illustrated with a dotted line.

As illustrated in FIG. 2, in an input method in which the electrostatic capacitance is detected, the input device TP1 referred to as the touch panel or a touch sensor includes a driving electrode E1 and a detection electrode E2, which are disposed opposite to each other interposing a dielectric substance D1. A capacitance element C1 is formed by the driving electrode E1 and the detection electrode E2. As illustrated in FIG. 3, one end of the capacitance element C1 is connected to an alternating current (AC) signal source S, which is a driving signal source, and the other end of the capacitance element C1 is connected to a voltage detector DET, which is an input detection unit. In the example illustrated in FIG. 1, the voltage detector DET is equivalent to, for example, a signal amplification unit 22 provided with a positive integrated circuit that amplifies an input detection signal.

When an alternating current (AC) rectangular wave Sg having a frequency of about several kilohertz to several hundreds kilohertz, for example, is applied from the AC signal source S to the one end of the capacitance element C1, or the driving electrode E1, through the voltage detector DET that is connected to the other end of the capacitance element C1, or to a detection electrode E2 side, a detection signal Vdet, which is an output waveform, is generated.

Note that the AC rectangular wave Sg is equivalent to, for example, the driving signal Vts illustrated in FIG. 4.

In a state where the finger is not in contact with or approaching, or a non-contact state, as illustrated in FIG. 3, accompanying charging and discharging of the capacitance element C1, a current $I_0$ according to a capacitance value of the capacitance element C1 flows. The voltage detector DET converts fluctuation of the current $I_0$ according to the AC rectangular wave Sg into fluctuation of a voltage. The fluctuation of the voltage is indicated by a waveform $V_0$ in a solid line in FIG. 4.

On the other hand, in a state where the finger is in contact with or approaching, or in a contact state, due to an influence of a capacitance element C2 formed by the finger, the capacitance value of the capacitance element C1 formed by the driving electrode E1 and the detection electrode E2 becomes small. Thus, a current $I_1$ which flows in the capacitance element C1 illustrated in FIG. 3, fluctuates. The voltage detector DET converts fluctuation of the current $I_1$ according to the AC rectangular wave Sg into fluctuation of the voltage. In other words, the voltage detector DET converts the detection signal Sdet, which is output from the detection electrode E2, into the detection signal Vdet, which is a voltage waveform. This fluctuation of the voltage is indicated by a waveform $V_1$ in a dashed line in FIG. 4. In this case, the waveform $V_1$ has amplitude smaller than that of the above-described waveform $V_0$. Accordingly, an absolute value $|\Delta V|$ of a voltage difference between the waveform $V_0$ and the waveform $V_1$ changes by an influence of an object such as a finger that is approaching from the outside. Note that, in order to accurately detect the absolute value $|\Delta V|$ of the voltage difference between the waveform $V_0$ and the waveform $V_1$, it is preferred that a period Reset, in which charging and discharging of a capacitor is reset according to the frequency of the AC rectangular wave Sg by switching in a circuit, be provided to the voltage detector DET during operation thereof.

In the example illustrated in FIG. 1, following the driving signal Vts supplied from the input detection driver DR1, the input detection unit 10 performs input detection for each driving range including one or multiple driving electrodes DRL. That is, the input detection unit 10 outputs the detection signal Sdet for each of the driving ranges including one or multiple driving electrodes DRL. The detection signal Sdet is output from a plurality of detection electrodes DTL equivalent to the detection electrode E2 illustrated in FIG. 2. The detection signal Sdet that is output is supplied to the signal amplification unit 22 of the detection circuit portion 20 and is converted into the detection signal Vdet by a part equivalent to the voltage detector DET illustrated in FIG. 3.

An A/D converter 23 illustrated in FIG. 1 is a circuit that samples and converts each analog signal, which is output from the signal amplification unit 22, into a digital signal in timing synchronized with the driving signal Vts.

A signal processing unit 24 includes a digital filter that reduces a frequency component other than the frequency of the sampled driving signal Vts, or a noise component, included in an output signal of the A/D converter 23. The signal processing unit 24 is a logical circuit that detects presence or absence of a touch on the input detection unit 10 based on the output signal of the A/D converter 23. The signal processing unit 24 performs processing of extracting only a difference voltage due to the finger. This difference voltage due to the finger is the above-described absolute value $|\Delta V|$ between the waveform $V_0$ and the waveform $V_1$ illustrated in FIG. 4. The signal processing unit 24 may perform operation for averaging the absolute value $|\Delta V|$ per one driving range and obtain an average value of the absolute value |ΔV|. Accordingly, it is possible for the signal processing unit 24 to reduce an influence of noise. The signal processing unit 24 compares the difference voltage due to the finger that is detected with a predetermined threshold voltage, and when the difference voltage due to the finger is greater than or equal to the threshold voltage, determines it is in the contact state with an external approaching object approaching from the outside, and when the difference voltage due to the finger is less than the threshold voltage, determines it is in the non-contact state with the external approaching object. In this way, the input detection by the detection circuit portion 20 is performed.

A coordinate extraction unit 25 is a logical circuit that obtains a coordinate of a touch position, or in other words, a position where an input signal is detected, when the touch is detected by the signal processing unit 24. A detection timing control unit 26 controls such that the A/D converter 23, the signal processing unit 24, and the coordinate extraction unit 25 operate in synchronization with each other. The coordinate extraction unit 25 outputs the position on a coordinate plane of the touch panel as a signal output Vout.

As described above, the input device of the electrostatic capacitance detection type includes the input detection unit 10 (see FIG. 1) that detects the output signal based on a capacitance change of the capacitance element C1 (see FIGS. 2 and 3) of each of the plurality of detection electrodes DTL (see FIG. 1), which is the electrode for detecting the input signal. As described below, as a modification of the input device TP1 illustrated in FIG. 1, there is also a method of applying a driving signal to each of the plurality of detection electrodes DTL, which is the electrode for detecting the input signal, and not providing the detection electrode DTL and the driving electrode DRL separately. Even in this modification, however, it is the same as the input device TP1 illustrated in FIG. 1 in that the output signal is detected based on the electrostatic capacitance of each of the plurality of detection electrodes DTL.

Figure 5:
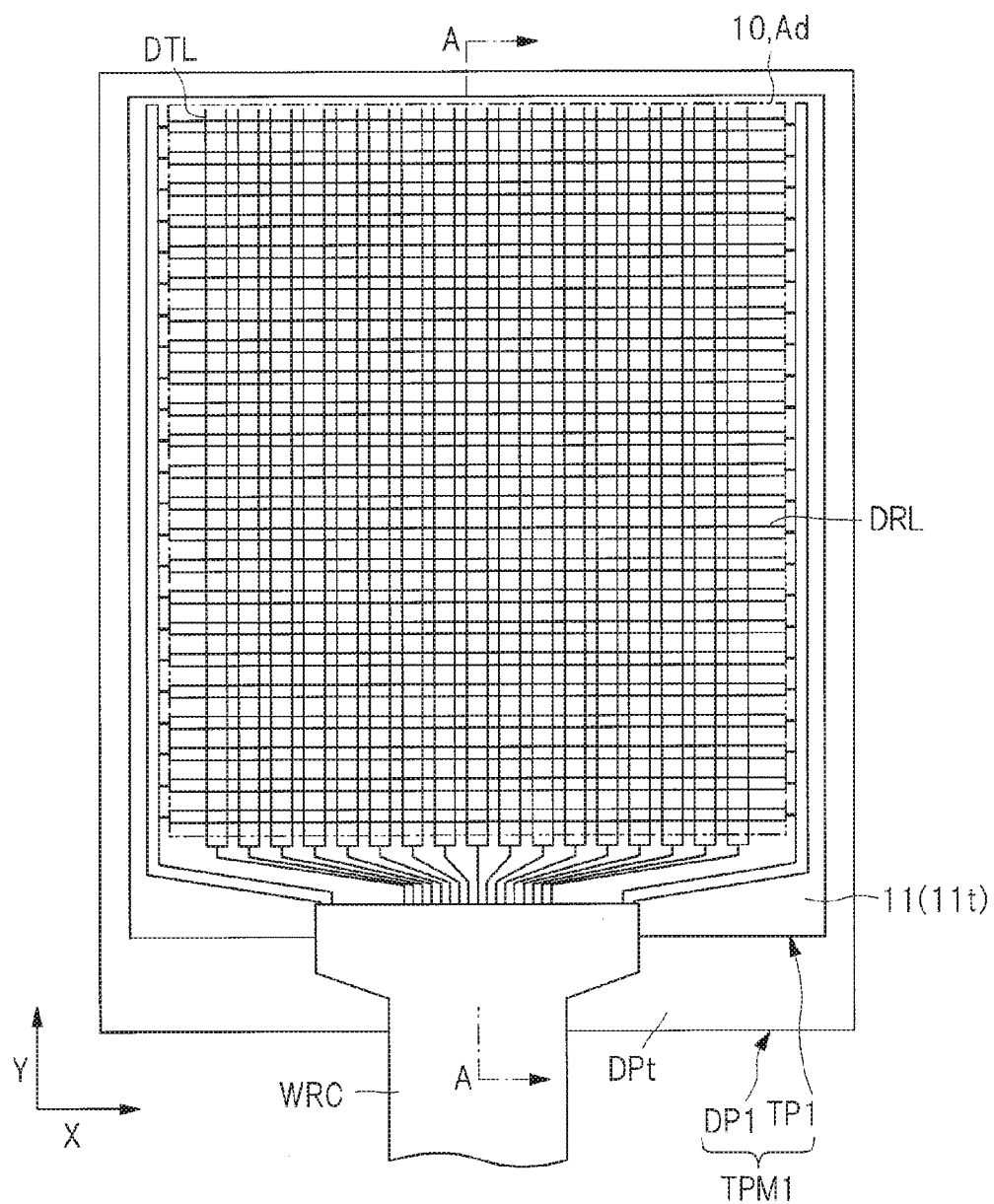
FIG. 5 is an enlarged plan view illustrating an exemplary touch panel module on which the input device illustrated in FIG. 1 is mounted.
Figure 6:
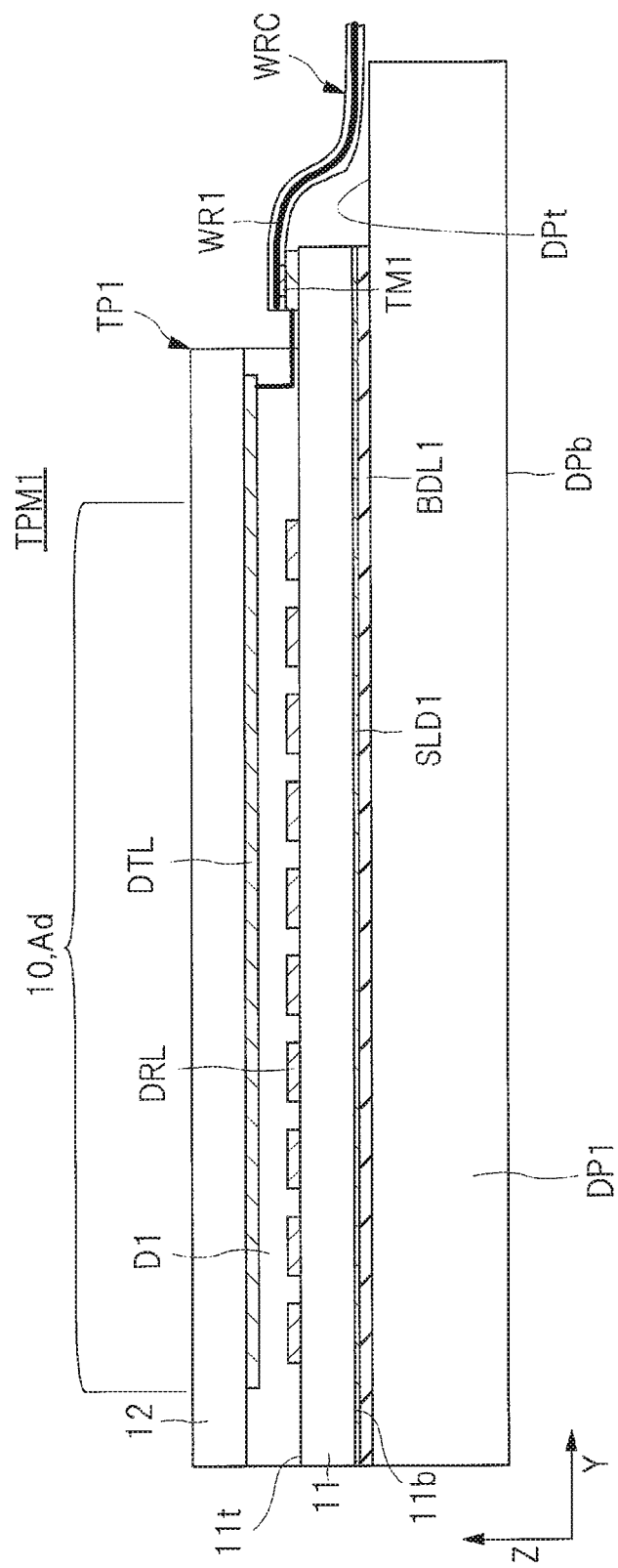
FIG. 6 is an enlarged cross-sectional view taken along a line A-A of FIG. 5.

FIG. 5 is an enlarged plan view illustrating an exemplary touch panel module on which the input device illustrated in FIG. 1 is mounted. Also, FIG. 6 is an enlarged cross-sectional view taken along a line A-A of FIG. 5. Note that, in FIG. 5, illustration of a substrate 12 of FIG. 6 is omitted in order to specify an exemplary layout of the plurality of detection electrodes DTL and the plurality of driving electrodes DRL.

As illustrated in FIG. 5, a touch panel module TPM1, which is a display device with an input detection function, includes the input device TP1 illustrated in FIG. 1, and a display device DP1 disposed so as to overlap with the input device TP1. The display device DP1 has two principal surface DPt and principal surface DPb that are positioned opposite to each other (see FIG. 6). The input device TP1 includes the input detection unit 10, and a substrate 11 on which the input detection unit 10 is mounted.

In the example illustrated in FIG. 6, among the two principal surfaces DPt and DPb provided to the display device DP1, the input device TP1 is fixed by bonding to the principal surface DPt on a side where visible light for forming a display image is output, or in other words, to the principal surface DPt on a display surface side, through a bonding layer BDL1 (see FIG. 6). More specifically, in a state where a principal surface 11b of the substrate 11 and the principal surface DPt of the display device DP1 are disposed opposite to each other, the input device TP1 is bonded to the display device DP1 through the bonding layer BDL1.

In an example illustrated in FIG. 6, a conductor layer SLD1 is disposed between the input device TP1 and the display device DP1. The conductor layer SLD1 is formed so as to cover a display area Ad of the display device DP1, and the conductor layer SLD1 functions as a shielding layer that suppresses a malfunction from occurring in the display device DP1 due to an influence of electro static discharge (ESD).

As illustrated in FIGS. 5 and 6, the touch panel module TPM1 according to this embodiment is the external type display device in which the display device DP1 and the input device TP1, which are independent from each other, are used in a state of overlapping with each other in a plan view.

Note that, in the present application, "in a plan view" means to view in a direction perpendicular to the principal surface DPt of the display device DP1. In the input device TP1, "in a plan view" means to view in a direction perpendicular to a principal surface 11t of the substrate 11.

The display device DP1 provided to the touch panel module TPM1 is not particularly limited as long as it has the principal surface DPt on which the input device TP1 can be mounted. For example, an exemplary display device DP1 may be a liquid crystal display device having a liquid crystal layer as a display function element. For example, another exemplary display device DP1 may be an organic electroluminescence (EL) display device having a light-emitting diode constituted of an organic compound as the display function element.

As illustrated in FIG. 5, the input detection unit 10 includes the plurality of driving electrodes DRL and the plurality of detection electrodes DTL. Here, in FIG. 5, two directions that cross, preferably orthogonal to, each other within the principal surface 11t of the substrate 11 are referred to as an X axis direction and a Y axis direction. At this time, in the example illustrated in FIG. 5, each of the plurality of driving electrodes DRL extends in the X axis direction and is arrayed in the Y axis direction. Each of the plurality of detection electrodes DTL, in a plan view, extends in the Y axis direction and is arrayed in the X axis direction. That is, each of the plurality of detection electrodes DTL, in a plan view, crosses the plurality of driving electrodes DRL. Note that, in a plan view, an area where the input detection unit 10 is formed overlaps with the display area Ad where an image is displayed by the display device DP1.

In the example illustrated in FIG. 5, in a plan view, the input detection unit 10 is provided with two sides each extending in the X axis direction and two sides each extending in the Y axis direction. In the example illustrated in FIG. 5, the input detection unit 10 has a quadrilateral shape such as a rectangle in a plan view. On the outside of one side of the input detection unit 10 in the Y axis direction, there is provided a terminal unit TM1 to which a wiring material WRC is connected. The input detection unit 10 is electrically connected to the wiring material WRC having a plurality of wirings. The wiring material WRC is a wiring member referred to as a so-called flexible substrate constituted of, for example, a resin base material layer in which a plurality of wirings WR1 (see FIG. 6) are formed. Among circuit blocks of the input device TP1 illustrated in the FIG. 1, all or part of the detection circuit portion 20 may be formed on the wiring material WRC. In this case, the wiring material WRC may be regarded as a part of the input device TP1 illustrated in FIG. 1. It is also possible to provide all or part of the detection circuit portion 20 to the outside of the touch panel module TPM1.

<Configuration of the Input Detection Unit>

Figure 7:
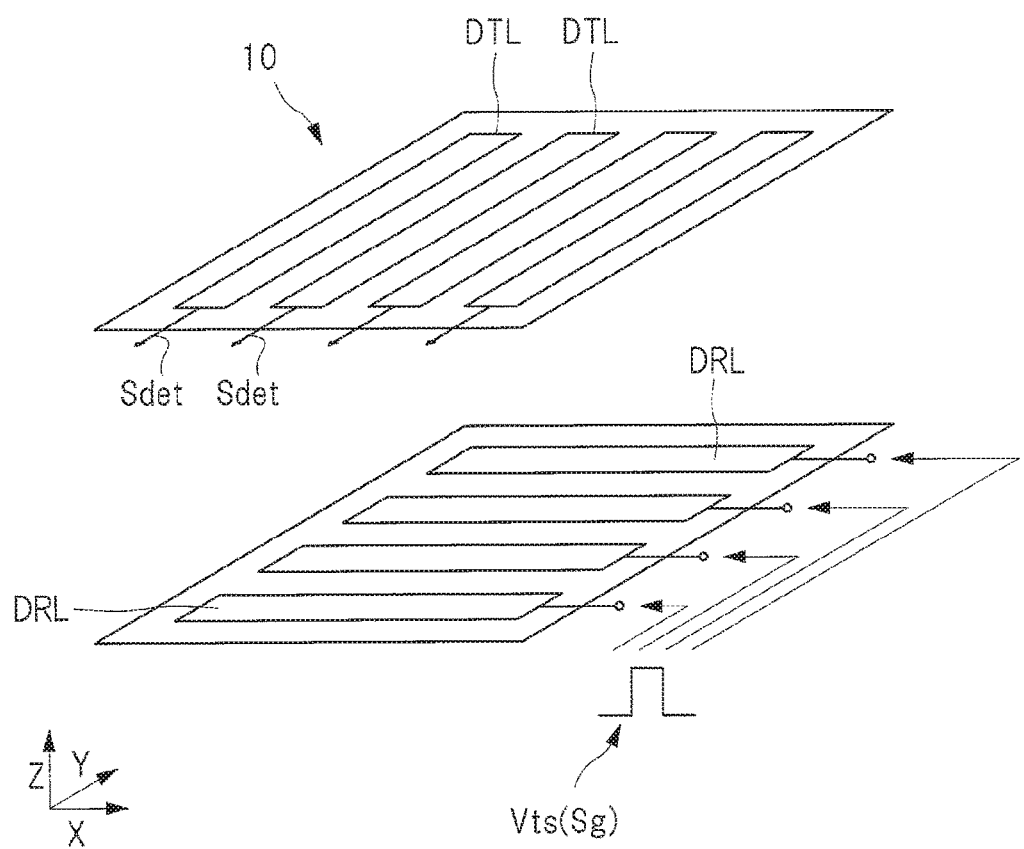
FIG. 7 is a perspective view schematically illustrating an exemplary positional relationship between a driving electrode and a detection electrode of an input detection unit illustrated in FIG. 1.
Figure 8:
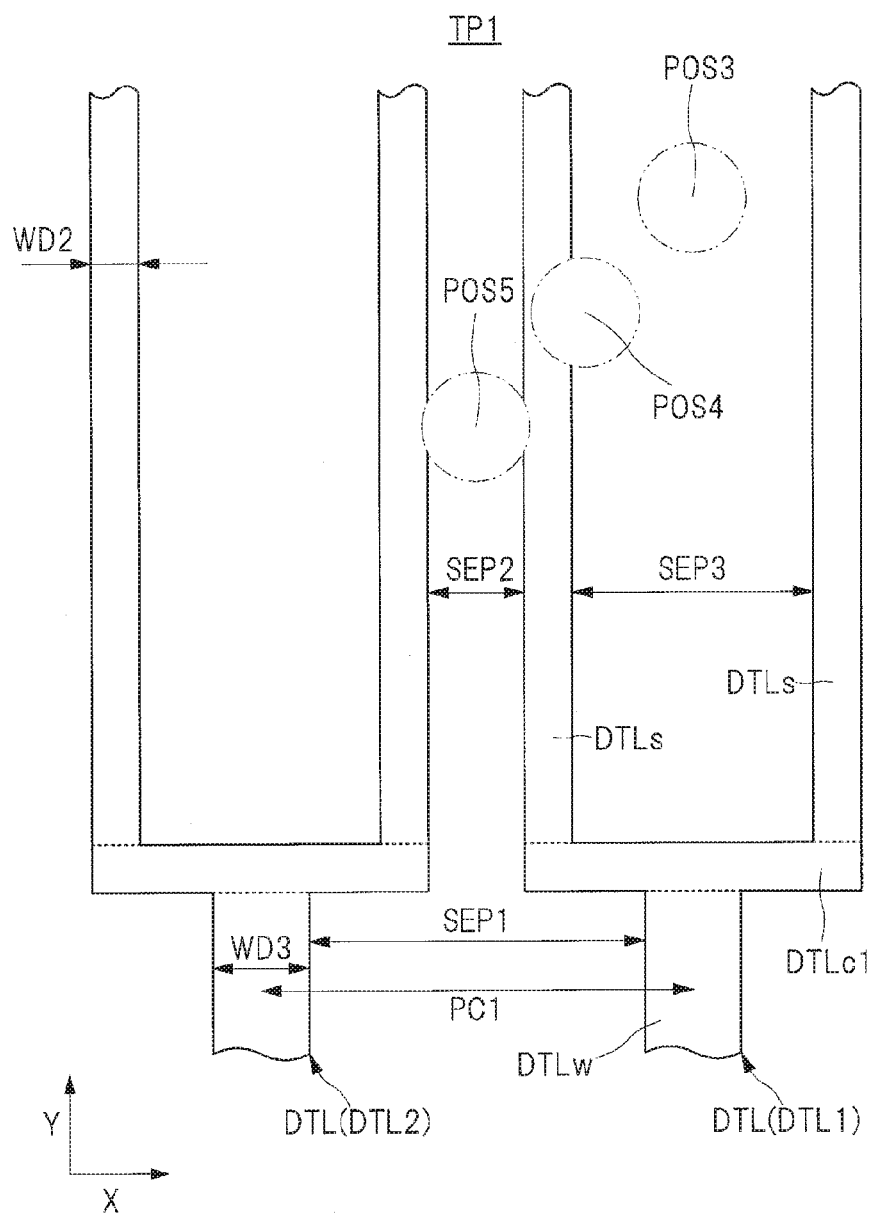
FIG. 8 is an enlarged plan view illustrating a part of a plurality of detection electrodes illustrated in FIG. 7 in an enlarged manner.
Figure 9:
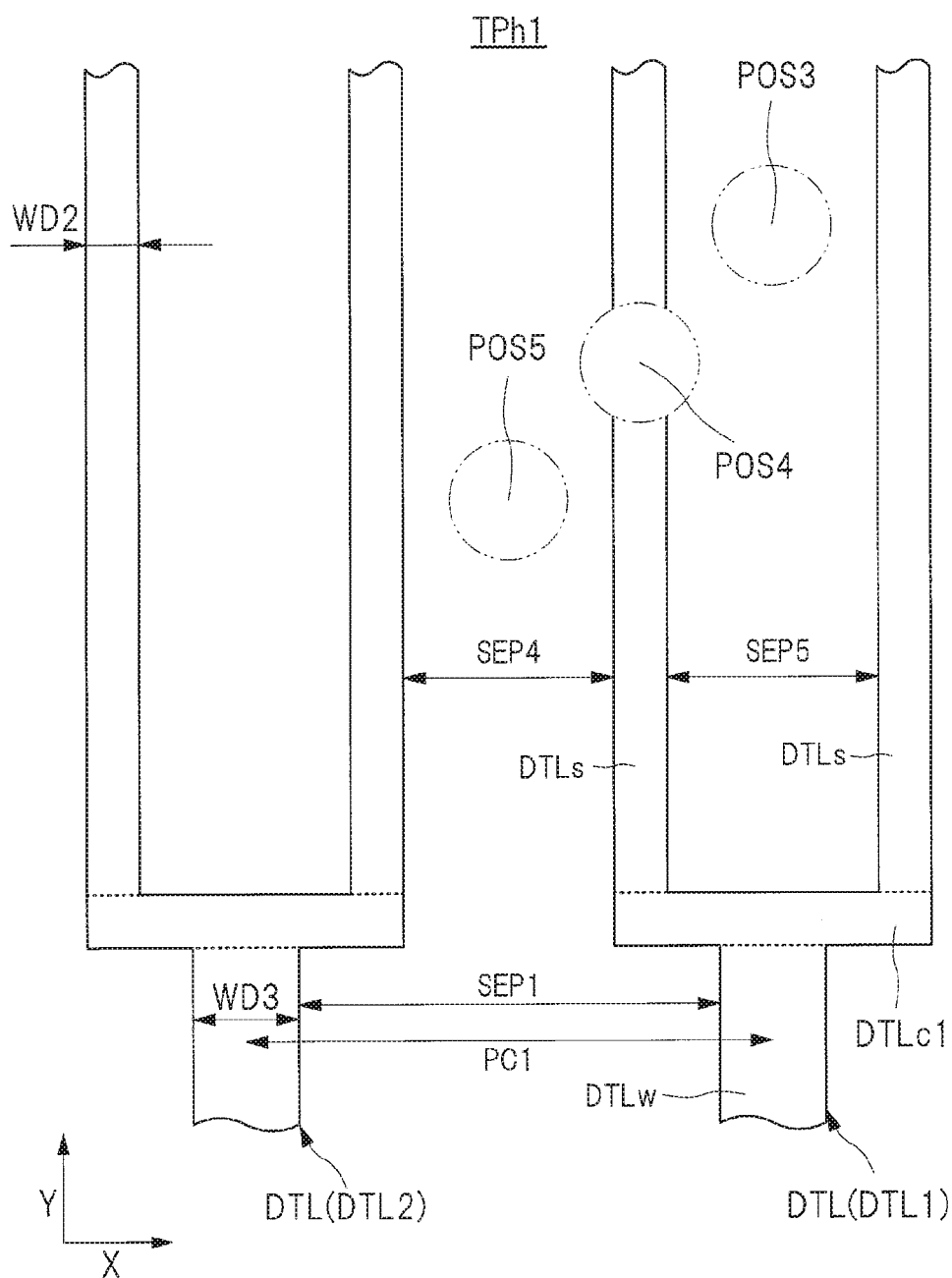
FIG. 9 is an enlarged plan view illustrating a part of a plurality of detection electrodes provided to an input device according to a comparative example to FIG. 8 in an enlarged manner.
Figure 10:
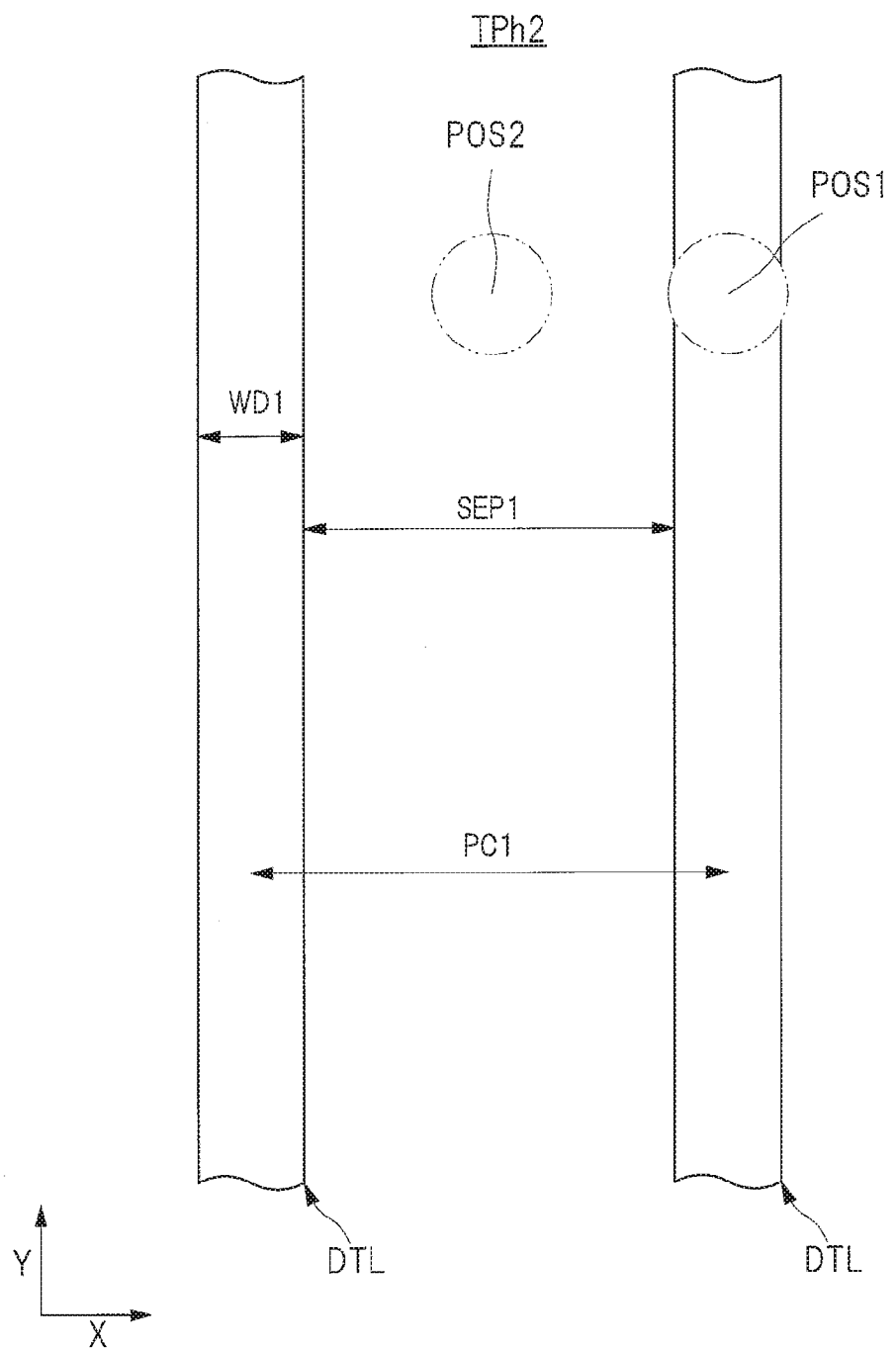
FIG. 10 is an enlarged plan view illustrating a part of a plurality of detection electrodes provided to an input device according to another comparative example to FIG. 8 in an enlarged manner.

Next, a configuration of the input detection unit 10 illustrated in FIG. 1 is described in detail. FIG. 7 is a perspective view schematically illustrating an exemplary positional relationship between a driving electrode and a detection electrode of an input detection unit illustrated in FIG. 1. FIG. 8 is an enlarged plan view illustrating a part of a plurality of detection electrodes illustrated in FIG. 7 in an enlarged manner. FIG. 9 is an enlarged plan view illustrating a part of a plurality of detection electrodes provided to an input device according to a comparative example to FIG. 8 in an enlarged manner. FIG. 10 is an enlarged plan view illustrating a part of a plurality of detection electrodes provided to an input device according to another comparative example to FIG. 8 in an enlarged manner.

Note that, in FIGS. 8 to 10, on a coordinate plane for position detection, a position where the input tool such as the touch pen is disposed is schematically indicated with a circle of a two dot chain line. In FIGS. 8 and 9, an electrode portion DTLs, a joining portion DTLc1, and a wiring portion DTLw are integrally formed; however, for a purpose of specifying a range of each of the portions, a boundary between the portions is indicated with a dotted line.

As illustrated in FIG. 7, the input detection unit 10 provided to the input device TP1 according to this embodiment (see FIG. 1) includes the plurality of driving electrodes DRL and the plurality of detection electrodes DTL that are provided so as to face each other. Each of the plurality of detection electrodes DTL extends in a direction of crossing a direction in which each of the plurality of driving electrodes DRL extends in a plan view. In other words, the plurality of detection electrodes DTL are arrayed so as to cross the plurality of driving electrodes DRL respectively in a plan view at an interval from each other. Then, each of the plurality of detection electrodes DTL faces each of the plurality of driving electrodes DRL in a direction perpendicular to the principal surface 11t of the substrate 11, that is, a Z axis direction, which is a thickness direction of the input device TP1 illustrated in FIG. 6.

Each of the plurality of detection electrodes DTL is connected to the signal amplification unit 22 of the detection circuit portion 20 illustrated in FIG. 1. Electrostatic capacitance is generated in an intersection portion of each of the plurality of driving electrodes DRL and each of the plurality of detection electrodes DTL in a plan view. Based on the electrostatic capacitance between each of the plurality of driving electrodes DRL and each of the plurality of detection electrodes DTL, an input position is detected. That is, the detection circuit portion 20 detects the input position based on the electrostatic capacitance between the plurality of driving electrodes DRL and the plurality of detection electrodes DTL.

Each of the plurality of driving electrodes DRL illustrated in FIG. 7 is connected to the input detection driver DR1 as a driving unit having a driving circuit that supplies the driving signal Vts to the input detection unit 10 illustrated in FIG. 1. In the input detection unit 10, in performing an input detection operation, for example, one or multiple driving electrodes DRL are selected in order by the input detection driver DR1. In FIG. 7, a method of selecting one driving electrode DRL in order is schematically illustrated; however, it is also possible to select multiple driving electrodes, which are adjacent to each other. To the one or multiple driving electrodes DRL that are selected, the driving signal Vts is supplied and input, and the detection signal Sdet for detecting the input position is generated and output from the detection electrode DTL. As described above, the detection signal Sdet is converted into the detection signal Vdet, which is the voltage waveform, in the detection circuit portion 20 illustrated in FIG. 1. In this way, in the input detection unit 10, the input detection is performed for each driving range including the one or multiple driving electrodes DRL that are selected. The one or multiple driving electrodes DRL included in one driving range corresponds to the driving electrode E1 (see FIG. 2) while the detection electrode DTL corresponds to the detection electrode E2 (see FIG. 2) in the above-described principle of the input detection.

As illustrated in FIG. 7, the plurality of driving electrodes DRL and the plurality of detection electrodes DTL that cross each other in a plan view form an electrostatic capacitance type touch sensor arrayed in a matrix. Thus, by scanning an entire input detection surface of the input detection unit 10, it is possible to detect the position where the finger or the like contacts or approaches.

Here, in a case where the plurality of detection electrodes DTL are arrayed along one direction (X axis direction in the example illustrated in FIG. 7) as in this embodiment, an arrangement interval between the detection electrodes DTL has a large influence on accuracy of position detection. In particular, in a case where the input tool for inputting a signal has a small area, the detection signal Sdet from the detection electrode DTL tends to be small when the input tool is disposed between the adjacent detection electrodes DTL.

As an input device TPh2 illustrated in FIG. 10, for example, there is described an example in which each of the plurality of detection electrodes DTL is a belt-shaped conductor pattern that extends along the Y axis direction and is arrayed along the X axis direction at an equal interval. Each of the plurality of detection electrodes DTL illustrated in FIG. 10 has a width WD1 in the X axis direction orthogonal to the Y axis direction, which is an extending direction. A value of the width WD1 is, for example, about 0.8 mm. An array pitch between the adjacent detection electrodes DTL, that is, a center-to-center distance PC1, for example, is 4 mm. Thus, a separation distance SEP1 between the adjacent detection electrodes DTL is 3.2 mm.

In a case where a finger of a person is used as the input tool, for example, when the separation distance SEP1 is about 3.2 mm as illustrated in FIG. 10, erroneous detection of the input position hardly occurs. In a case where the separation distance SEP1 is sufficiently small relative to thickness of the finger in general, sufficient detection signal intensity can be obtained by disposing the finger to any position on the coordinate plane. However, in a case where a touch pen having a diameter of about 1 mm at a tip part thereof is used as the input tool, for example, the erroneous detection may occur depending on the position of the touch pen. In addition, in a case where the finger in a state of wearing gloves is used in inputting, the diameter of the part to be recognized by the input device is smaller than a diameter of the actual finger.

For example, in a case where the touch pen is disposed to a coordinate POS1 illustrated in FIG. 10, the detection signal Sdet (see FIG. 7) having sufficient signal intensity is output from the detection electrode DTL that overlaps with the coordinate POS1. In a case where the touch pen is disposed to a coordinate POS2, however, since the coordinate POS2 is far from both of the adjacent detection electrodes DTL, the signal intensity of the detection signal Sdet is smaller than that at the coordinate POS1. For this reason, in a case where a waveform of the detection signal Vdet (see FIG. 3) detected at the coordinate POS2 is smaller than a threshold that is set, the detection signal Vdet at the coordinate POS2 is not detected as the input signal. Moreover, lowering the threshold that is set causes the noise to be easily detected, whereby it causes the erroneous detection.

On the other hand, reducing the arrangement interval of the plurality of detection electrodes DTL leads to an increased arrangement density of the detection electrodes DTL. In this case, the visible light generated from the display device DP1 (see FIG. 6) is interrupted by the detection electrodes DTL, whereby visibility of the display image may decrease. In a case where the arrangement density of the detection electrodes DTL increases, the number of electric lines of force that passes through the adjacent detection electrodes DTL decreases, whereby the detection signal Sdet from the detection electrode DTL may be small.

In a case where the arrangement interval among the plurality of detection electrodes DTL decreases by increasing the number of the detection electrodes DTL disposed per unit area, the number of detection circuit portions 20 (see FIG. 1) connected to each of the plurality of detection electrodes DTL increases. In a case of a configuration in which the voltage detector DET (see FIG. 3) is connected to each of the detection electrodes DTL, for example, the number of detection electrodes DTL increases according to the number of voltage detectors DET.

In this way, an increase of the number of circuits such as the voltage detector DET is a cause of hindering downsizing of the touch panel module TPM1 illustrated in FIGS. 5 and 6. An increase of the number of the circuits such as the voltage detector DET is also a cause of increasing a probability of failure of part of the circuits.

Accordingly, the present inventor has studied a technique for suppressing an increase of the arrangement density of the detection electrode DTL while improving accuracy of the position detection. First, as illustrated in FIGS. 8 and 9, the present inventor has studied a structure in which each of the plurality of detection electrodes DTL is divided into a plurality of electrode portions DTLs, and each of the plurality of electrode portions DTLs is connected to each other by the joining portion DTLc1.

Each of the plurality of detection electrodes DTL, which is provided to each of the input device TP1 illustrated in FIG. 8 and an input device TPh1 illustrated in FIG. 9, has the plurality of electrode portions DTLs, each of which extends along the Y axis direction, and the joining portion DTLc1 that connects the plurality of electrode portions DTLs with each other.

Each of the plurality of electrode portions DTLs illustrated in FIGS. 8 and 9 has a width WD2 in the X axis direction orthogonal to the Y axis direction, which is the extending direction. A value of the width WD2 is, for example, 0.4 mm. In the example illustrated in FIGS. 8 and 9, a width WD3 of the wiring portion DTLw is, for example, 0.8 mm, whereby the width WD2 of the electrode portion DTLs is smaller than the width WD3 of the wiring portion DTLw. The array pitch between the adjacent detection electrodes DTL, that is, the center-to-center distance PC1, is 4 mm, for example. That is, in a plan view, the arrangement density of the plurality of electrode portions DTLs is at the same level as the arrangement density of the plurality of detection electrodes DTL illustrated in FIG. 10. For this reason, according to a layout of the detection electrodes DTL illustrated in FIGS. 8 and 9, it is possible to suppress the visibility of the display image from decreasing due to interruption of the visible light generated from the display device DP1 (see FIG. 6) by the electrode portions DTLs.

In the input device TP1 illustrated in FIG. 8 and the input device TPh1 illustrated in FIG. 9, each of the plurality of electrode portions DTLs is connected by the joining portion DTLc1, whereby it is possible to suppress the detection circuit such as the voltage detector DET (see FIG. 3) from increasing.

In a case of the input device TP1 illustrated in FIG. 8 and the input device TPh1 illustrated in FIG. 9, the separation distance between the adjacent electrode portions DTLs is small compared to the separation distance SEP1 illustrated in FIG. 10. In the example illustrated in FIG. 8, for example, a separation distance SEP2 between the detection electrodes DTL adjacent to each other is smaller than the separation distance SEP1 between wiring portions DTLw adjacent to each other and is, for example, 0.8 mm. Among the plurality of electrode portions DTLs constituting one detection electrode DTL, a separation distance SEP3 between the electrode portions DTLs adjacent to each other is 2.4 mm. In the example illustrated in FIG. 9, for example, a separation distance SEP4 between the detection electrodes DTL adjacent to each other and a separation distance SEP5 between the electrode portions DTLs adjacent to each other among the plurality of electrode portions DTLs constituting one detection electrode DTL are 1.6 mm.

In this way, according to the input device TP1 illustrated in FIG. 8 and the input device TPh1 illustrated in FIG. 9, it is possible to reduce the separation distance between the adjacent electrode portions DTLs, whereby compared to the example illustrated in FIG. 10, it is possible to increase the signal intensity of the detection signal Sdet (see FIG. 7) output from the detection electrode DTL.

Figure 11:
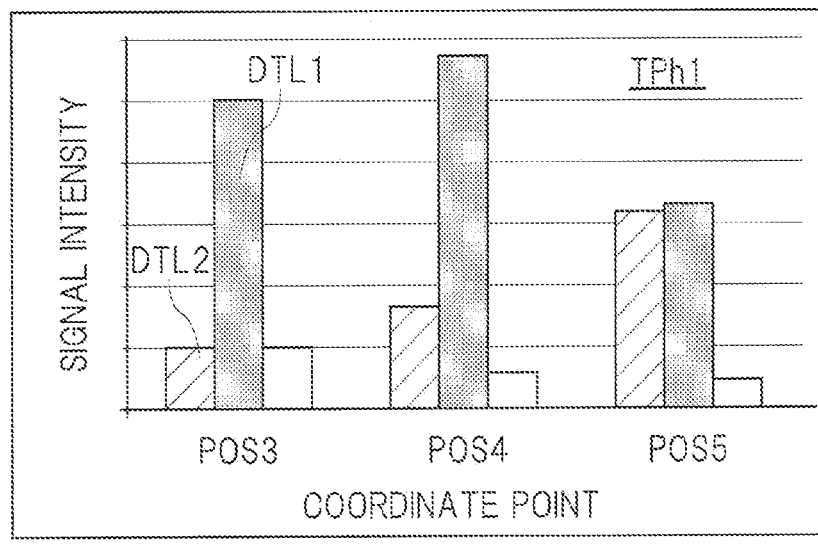
FIG. 11 is an explanatory graph illustrating a relationship between a position of an input tool on a coordinate plane and signal intensity of a detection signal output from the detection electrodes of the input device illustrated in FIG. 8.
Figure 12:
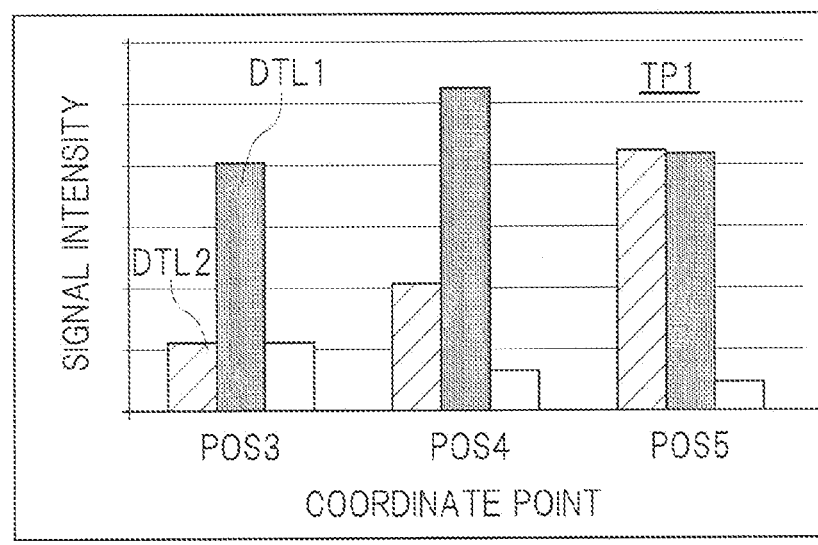
FIG. 12 is an explanatory graph illustrating a relationship between a position of an input tool on a coordinate plane and signal intensity of a detection signal output from the detection electrodes of the input device illustrated in FIG. 9.

The present inventor has conducted a further study, however, and has found out that in the layout of the detection electrode DTL illustrated in FIG. 9, the signal intensity becomes low at a coordinate POS5, which is an intermediate position between the adjacent detection electrodes DTL, causing the erroneous detection. FIG. 11 is an explanatory graph illustrating a relationship between the position of the input tool on the coordinate plane and the signal intensity of the detection signal output from the detection electrode of the input device illustrated in FIG. 8. FIG. 12 is an explanatory graph illustrating a relationship between the position of the input tool on the coordinate plane and the signal intensity of the detection signal output from the detection electrode of the input device illustrated in FIG. 9. In FIGS. 8 and 9, a central position in the X axis direction, which is a width direction of the detection electrode DTL, is indicated as a coordinate POS3. The intermediate position between the adjacent detection electrodes DTL is indicated as the coordinate POS5. In the X axis direction, an intermediate position between the coordinate POS3 and the coordinate POS5 is indicated as a coordinate POS4. In FIGS. 11 and 12, positions of coordinate points illustrated in FIGS. 8 and 9 are indicated on a horizontal axis and the signal intensity at each of the coordinate points is indicated on a vertical axis. In FIGS. 11 and 12, the signal intensity of the detection signal from a detection electrode DTL1 illustrated in FIGS. 8 and 9 is indicated with a dot pattern, and the signal intensity of the detection signal from a detection electrode DTL2 is indicated with a hatch pattern. In FIGS. 11 and 12, among the detection electrodes on both sides of the detection electrode DTL1 illustrated in FIGS. 8 and 9, the signal intensity of the detection signal from the detection electrode disposed on an opposite side of the detection electrode DTL2 (illustration omitted) is indicated with a solid white pattern.

In a case where the separation distance SEP4 and the separation distance SEP5 are the same value as in the input device TPh1 illustrated in FIG. 9, each of the plurality of electrode portions DTLs is arrayed at an equal interval. For this reason, considering balance of the signal intensity between the coordinate POS3 and the coordinate POS5 illustrated in FIG. 9, the layout illustrated in FIG. 9 seems to be particularly preferable.

As illustrated in FIG. 11, in the input device TPh1, however, the signal intensity at the coordinate POS5 is smaller than the signal intensity at the coordinate POS3 at about 65%. In a case where a threshold is set for the input device TPh1, it is necessary to use the signal intensity at the coordinate POS5 as a standard in setting; otherwise, it is not possible to detect the detection signal at the coordinate POS3 as the input signal. In the input device TPh1, in a case where the threshold is set low by using the detection signal at the coordinate POS3 as the standard, it may increase a possibility of erroneous detection of another signal caused by noise. In a case where a potential of the driving signal is increased for a purpose of increasing the signal intensity, power consumption of the input device TPh1 increases. Depending on a type of the noise, it may be still difficult to prevent the erroneous detection by increasing the potential of the driving signal.

The present inventor has conducted a study and has found out that on the coordinate plane on which the input signal is detected, there is a positional misalignment between a coordinate of a position where the input tool is actually brought into contact and a coordinate that is output by the input device TPh1 illustrated in FIG. 9. It is also found out that there is a tendency in the positional misalignment. In an array direction of the plurality of detection electrodes DTL (X axis direction in the example illustrated in FIG. 9), there is the tendency that the positional misalignment occurs in a direction toward a centerline of each of the detection electrodes DTL, or in other words, in a direction away from the intermediate position between the adjacent detection electrodes DTL.

Since the tendency in the positional misalignment as described above has been found out, the present inventor has studied a method for correcting the positional misalignment by inserting a circuit for correcting the positional misalignment into the detection circuit portion 20 illustrated in FIG. 1. However, a level of the positional misalignment changes depending on a diameter of a tip part of the input tool, whereby it has been found out that complicated processing such as recognizing a shape of the input tool is required.

Accordingly, the present inventor has studied a method for suppressing the erroneous detection such as the above-described positional misalignment by a structure of the detection electrode DTL. A reason why the signal intensity at the coordinate POS3 is larger than the signal intensity at the coordinate POS5 may be considered as follows. That is, when the input tool is disposed to the coordinate POS3 between the plurality of electrode portions DTLs constituting one detection electrode DTL, a change of the electrostatic capacitance occurs to each of the plurality of electrode portions DTLs. For this reason, the detection signal that is output when the input tool is disposed to the coordinate POS3 illustrated in FIGS. 8 and 9 is a synthetic value of the signal output from the plurality of electrode portions DTLs (two in FIGS. 8 and 9) constituting the detection electrode DTL1. On the other hand, when the input tool is disposed to the coordinate POS5, which is in the middle between the adjacent detection electrodes DTL, the electrode portion DTLs on a detection electrode DTL2 side among the plurality of electrode portions DTLs constituting the detection electrode DTL1 becomes a major signal source of the detection signal. For this reason, in a case where a distance from the electrode portion DTLs on the detection electrode DTL2 side among the electrode portions DTLs to the coordinate POS5 is long, the signal intensity of the detection signal becomes small.

From a result of above-described studies, the present inventor has devised a layout of the detection electrode DTL as in the input device TP1 illustrated in FIG. 8. That is, as illustrated in FIG. 8, the plurality of detection electrodes DTL provided to the input device TP1 according to this embodiment are arrayed along the X axis direction at the separation distance SEP2. The plurality of electrode portions DTLs provided to each of the plurality of detection electrodes DTL are arrayed along the X axis direction at the separation distance SEP3. Then, the separation distance SEP2 is smaller than the separation distance SEP3.

In other words, in the input device TP1, the separation distance SEP2, which is the shortest distance between the electrode portions DTLs constituting the detection electrode DTL1 and the electrode portions DTLs constituting the detection electrode DTL2, is smaller than the separation distance SEP3 between the plurality of electrode portions DTLs constituting the detection electrode DTL1.

By reducing the separation distance SEP2 illustrated in FIG. 8 as in the input device TP1, as illustrated in FIG. 12, the signal intensity of the detection signal at the coordinate POS5 is larger than that in the input device TPh1 illustrated in FIG. 11. In the example illustrated in FIGS. 11 and 12, the signal intensity of the detection signal at the coordinate POS5 of the input device TP1 is larger than the signal intensity of the detection signal at the coordinate POS5 of the input device TPh1 by about 30%.

As illustrated in FIG. 12, the signal intensity of the detection signal at the coordinate POS3 of the input device TP1 is small compared to that of the input device TPh1 illustrated in FIG. 11. In the example illustrated in FIGS. 11 and 12, the signal intensity of the detection signal at the coordinate POS3 of the input device TP1 is smaller than the signal intensity of the detection signal at the coordinate POS3 of the input device TPh1 by about 20%. However, as illustrated in FIG. 12, the signal intensity of the detection signal at the coordinate POS3 of the input device TP1 is at the same level as the signal intensity of the detection signal at the coordinate POS5 thereof, and it is larger than the signal intensity of the detection signal at the coordinate POS5 thereof of the input device TPh1 illustrated in FIG. 11 by about 30%.

Thus, in the input device TP1, it is possible to set a threshold used for determining the detection signal as the input signal to a higher value than that in the input device TPh1. As a result, the input device TP1 improves detection accuracy of the input signal compared to the input device TPh1, whereby reliability thereof is improved. Note that the arrangement density of the plurality of electrode portions DTLs on the coordinate plane is the same in the input device TP1 illustrated in FIG. 8, the input device TPh1 illustrated in FIG. 9, and the input device TPh2 illustrated in FIG. 10. That is, according to this embodiment, it is possible to improve the detection accuracy of the input signal as well as to suppress the visibility of the display image from decreasing.

<Various Aspects of the First Embodiment>

Figure 13:
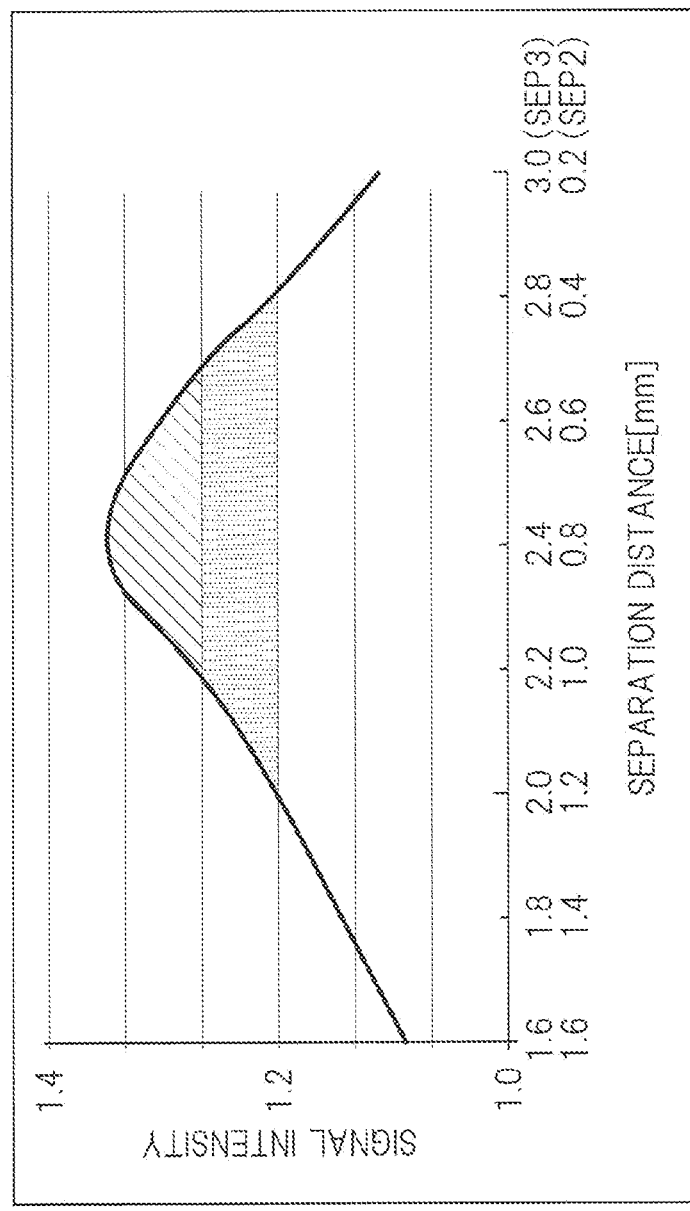
FIG. 13 is an explanatory graph illustrating a change in a value of signal intensity at a place where the signal intensity is the smallest when a relationship of a separation distance between a plurality of electrode portions illustrated in FIG. 8 is changed.

Next, various aspects of the first embodiment is described by giving descriptions on modifications. FIG. 13 is an explanatory graph illustrating a change in a value of signal intensity at a place where the signal intensity is the smallest when a relationship of a separation distance between a plurality of electrode portions illustrated in FIG. 8 is changed. In FIG. 13, values of the separation distance SEP2 and the separation distance SEP3 illustrated in FIG. 8 are indicated on a horizontal axis, and the signal intensity is indicated on a vertical axis. Data of the signal intensity illustrated in FIG. 13 is acquired in a state where the center-to-center distance PC1 illustrated in FIG. 8 is fixed to 4 mm and each of the width WD2 of each of the plurality of electrode portions DTLs is fixed to 0.4 mm. In other words, as the values are indicated on the horizontal axis illustrated in FIG. 13, the data are obtained under a condition in which a total value of the separation distance SEP2 and the separation distance SEP3 is 3.2 mm. On the vertical axis in FIG. 13, a ratio when the value of the signal intensity, which is used as the threshold for the input device TPh1 illustrated in FIG. 9, is 1 is described in a range of 1.0 to 1.4. As the value of the signal intensity illustrated in FIG. 13, among the coordinate POS3, the coordinate POS4, and the coordinate POS5 illustrated in FIG. 12, the signal intensity at the coordinate where the signal intensity is the smallest is indicated. Thus, in a range of 1.6 mm to 2.4 mm of the value of the separation distance SEP3, the value of the signal intensity at the coordinate POS5 is adopted. On the other hand, in a range of 2.4 mm to 3.0 mm of the value of the separation distance SEP3, the value of the signal intensity at the coordinate POS3 is adopted.

In FIG. 13, first, when the value of the separation distance SEP2 is smaller than the value of the separation distance SEP3, compared to the input device TPh1 illustrated in FIG. 11, it is possible to increase the value at the coordinate at which the signal intensity is the smallest. Note that, in FIG. 13, the data is acquired for the range up to 0.2 mm of the value of the separation distance SEP2. Then, when the value of the separation distance SEP2 is greater than or equal to 0.2 mm, that is, a half of the width WD2 of the electrode portion DTLs illustrated in FIG. 8, compared to the input device TPh1 illustrated in FIG. 11, it is possible to increase the value at the coordinate at which the signal intensity is the smallest. As the value of the separation distance SEP2 becomes closer to 0.0 mm, however, it becomes difficult for the electric lines of force to pass through between the electrode portion DTLs (see FIG. 8), whereby a characteristic of the signal intensity becomes closer to a characteristic of the input device TPh2 illustrated in FIG. 10. Thus, strictly speaking, it is preferred that the value of the separation distance SEP2 illustrated in FIG. 8 be greater than or equal to a half of the width WD2 of the electrode portion DTLs illustrated in FIG. 8. In addition, it is particularly preferred that the value of the separation distance SEP2 illustrated in FIG. 8 be greater than or equal to the width WD2 of the electrode portion DTLs illustrated in FIG. 8.

From FIG. 13, when the value of the separation distance SEP2 is smaller than or equal to three fifth (in other words, 60% or less) of the value of the separation distance SEP3 and is greater than or equal to the width WD2 of the electrode portion DTLs illustrated in FIG. 8, it is possible to make the value at the coordinate at which the signal intensity is the smallest greater than or equal to 1.2 times of the threshold used in the input device TPh1 illustrated in FIG. 9. In FIG. 13, a hatch pattern region and a dot pattern region are equivalent to this range. In this case, it is possible to increase the threshold by 10% or more compared to that for the input device TPh1 illustrated in FIG. 9, whereby it is possible to further improve the detection accuracy of the position of the input signal.

From FIG. 13, it is particularly preferred that the value of the separation distance SEP2 be greater than or equal to ⅕ (in other words, 20% or more) and smaller than or equal to one half (in other words, 50% or less) of the value of the separation distance SEP3. In FIG. 13, the hatch pattern region is equivalent to this range. In this case, it is possible to further increase the threshold compared to that for the input device TPh1 illustrated in FIG. 9, whereby it is possible to further improve the detection accuracy of the position of the input signal.

Considering that a touch pen having a diameter of 1 mm at a tip part thereof is used as the input tool as in this embodiment, it is preferred that the value of the separation distance SEP2 illustrated in FIG. 8 be smaller than or equal to 1 mm. In this case, as illustrated in FIG. 8, a part of the input tool is disposed to a position overlapping at least any part of the electrode portion DTLs, whereby it is possible to suppress a decrease of the signal intensity at the coordinate POS5 illustrated in FIG. 8.

Figure 14:
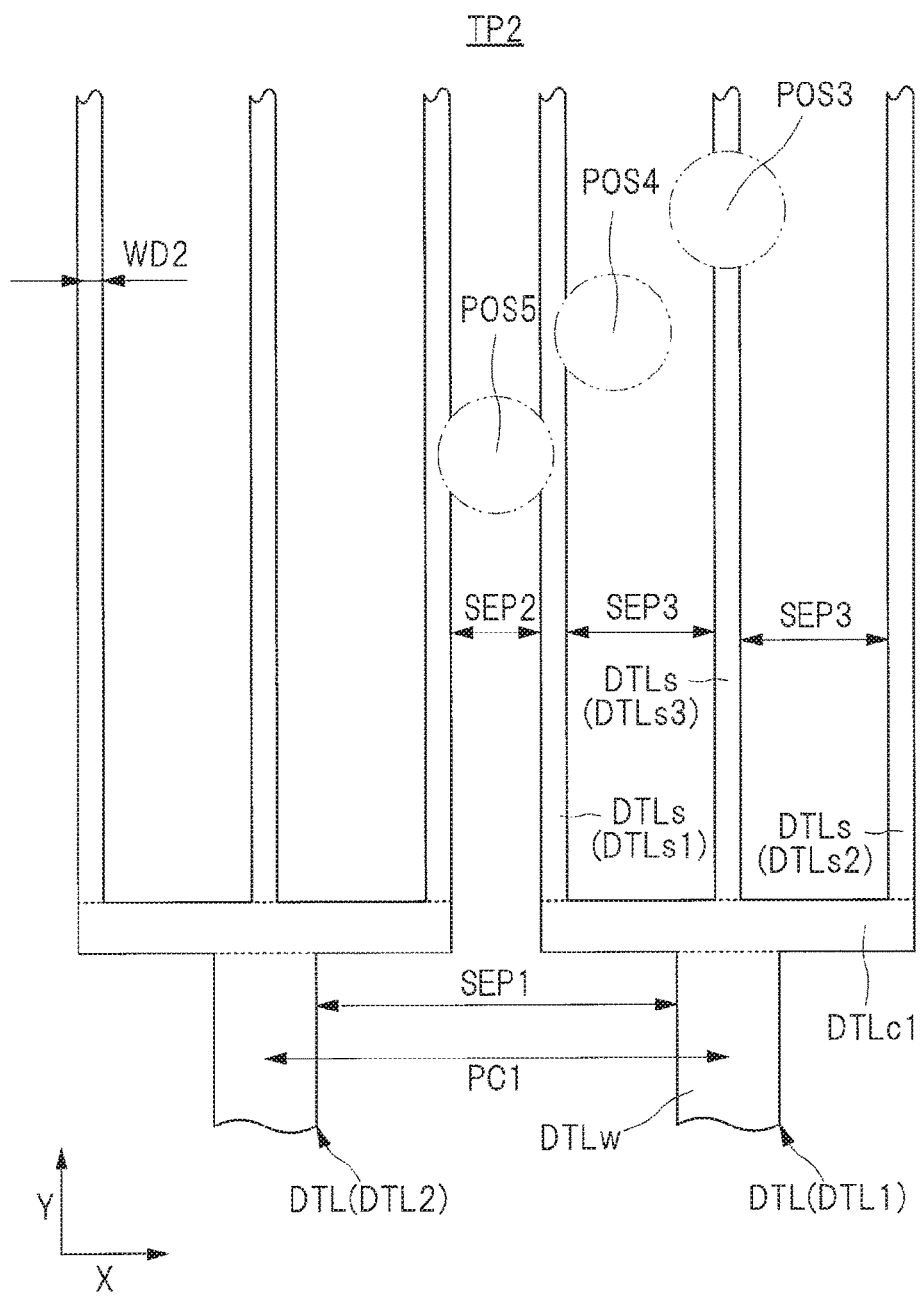
FIG. 14 is an enlarged plan view illustrating a part of the plurality of detection electrodes provided to the input device that is a modification to FIG. 8 in an enlarged manner.
Figure 15:
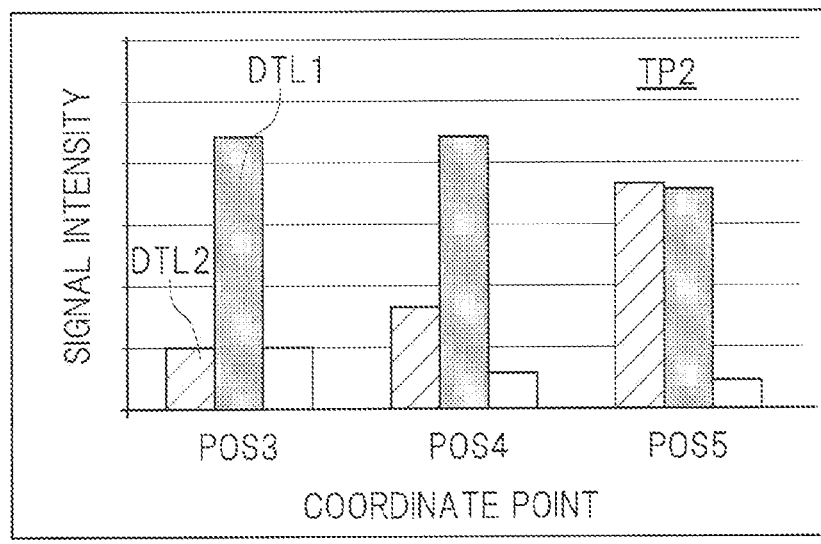
FIG. 15 is an explanatory graph illustrating a relationship between a position of an input tool on a coordinate plane and signal intensity of a detection signal, which is output from the detection electrode, in the input device illustrated in FIG. 14.

In FIG. 8, the example has been described in which each of the plurality of detection electrodes DTL is provided with two electrode portions DTLs; however, the number of the electrode portions DTLs provided to the detection electrode DTL may be larger than two. For example, each of the plurality of detection electrodes DTL provided to an input device TP2 according to a modification illustrated in FIG. 14 is provided with three electrode portions DTLs. FIG. 14 is an enlarged plan view illustrating a part of the plurality of detection electrodes provided to the input device that is a modification to FIG. 8 in an enlarged manner. FIG. 15 is an explanatory graph illustrating a relationship between a position of an input tool on a coordinate plane and signal intensity of a detection signal, which is output from the detection electrode, in the input device illustrated in FIG. 14.

Each of the plurality of detection electrodes DTL of the input device TP2 illustrated in FIG. 14 is different from the detection electrode DTL of the input device TP1 illustrated in FIG. 8 in that it is provided with three electrode portions DTLs. More specifically, the detection electrode DTL illustrated in FIG. 14 is provided with an electrode portion DTLs1 positioned at one end of an array of the plurality of electrode portions DTLs. The detection electrode DTL is also provided with an electrode portion DTLs2 connected to the electrode portion DTLs1 by the joining portion DTLc1. The detection electrode DTL is also provided with an electrode portion DTLs3 disposed between the electrode portion DTLs1 and an electrode portion DTLs2 and is connected to the electrode portion DTLs1 and the electrode portion DTLs2 by the joining portion DTLc1.

In the example illustrated in FIG. 14, the plurality of electrode portions DTLs constituting one detection electrode DTL are arrayed along the X axis direction at an equal interval. In other words, each of the electrode portion DTLs1, the electrode portion DTLs2, and the electrode portion DTLs3 is arrayed along the X axis direction at the separation distance SEP3. In the same way as in FIG. 8, the separation distance SEP2 between the plurality of detection electrodes DTL has a smaller value than that of the separation distance SEP3. In the example illustrated in FIG. 14, for example, the separation distance SEP3 is 1.4 mm, and the separation distance SEP2 is 0.6 mm.

In a case where the number of the electrode portions DTLs provided to one detection electrode DTL is greater than or equal to three as in the input device TP2, when the value of the width WD2 of the electrode portion DTLs is set to 0.4 mm, the arrangement density of the electrode portion DTLs becomes high compared to that of the input device TP1 illustrated in FIG. 8. Thus, from a view point of reducing the arrangement density of the electrode portion DTLs, it is preferred that the width WD2 of the plurality of electrode portions DTLs provided to the input device TP2 be smaller than the width WD2 of the plurality of electrode portions DTLs provided to the input device TP1 illustrated in FIG. 8. In the example illustrated in FIG. 14, the width WD2 of each of the plurality of electrode portions DTLs is thinner than that of the example illustrated in FIG. 8 and is, for example, 0.2 mm.

As illustrated in FIG. 15, in the input device TP2, the signal intensity at the coordinate POS5 is small compared to that of the input device TP1 illustrated in FIG. 12. It is considered that the signal intensity is reduced as a result of setting the width WD2 illustrated in FIG. 14 to 0.2 mm. Compared to the input device TPh1 illustrated in FIG. 11, however, the signal intensity at the coordinate POS5 is larger in the input device TP2 illustrated in FIG. 15. Although illustration is omitted, note that the present inventor has conducted an evaluation of the signal intensity as illustrated in FIG. 15 under a condition in which the center-to-center distance PC1 illustrated in FIG. 14 is fixed to 4 mm and the width WD2 of the electrode portion DTLs is fixed to 0.2 mm and by changing the value of the separation distance SEP2, which is the shortest distance between the adjacent detection electrodes DTL, in a range of 0.2 mm to 1.0 mm. As a result, in the above-described range, a result equivalent to an evaluation result illustrated in FIG. 15 has been confirmed, that is, the signal intensity at the coordinate POS5, at which the signal intensity is the smallest, becomes larger than that of the input device TPh1 illustrated in FIG. 11.

From this evaluation result, as in the input device TP2 exemplified in FIG. 14, even in a case where each of the plurality of detection electrodes DTL is provided with three or more electrode portions DTLs, as long as the condition that the value of the separation distance SEP2 is smaller than the value of the separation distance SEP3 is satisfied, it is found that a minimum value of the signal intensity can be increased.

Note, however, that in a case where the number of the electrode portions DTLs increases, as described above, it is preferred that the width WD2 of each of the plurality of electrode portions DTLs be narrowed. However, narrowing the width of the electrode portions DTLs may increase a possibility of disconnection that may be caused to a part of the plurality of electrode portions DTLs. Thus, in a case where the number of the electrode portions DTLs increases, it is preferred that each of the plurality of electrode portions DTLs be electrically connected at more than one parts including the joining portion DTLc1. Accordingly, it is possible to bypass each of the plurality of electrode portions DTLs, whereby it is possible to suppress the detection accuracy from decreasing even when a part of the electrode portions DTLs is disconnected.

Figure 16:
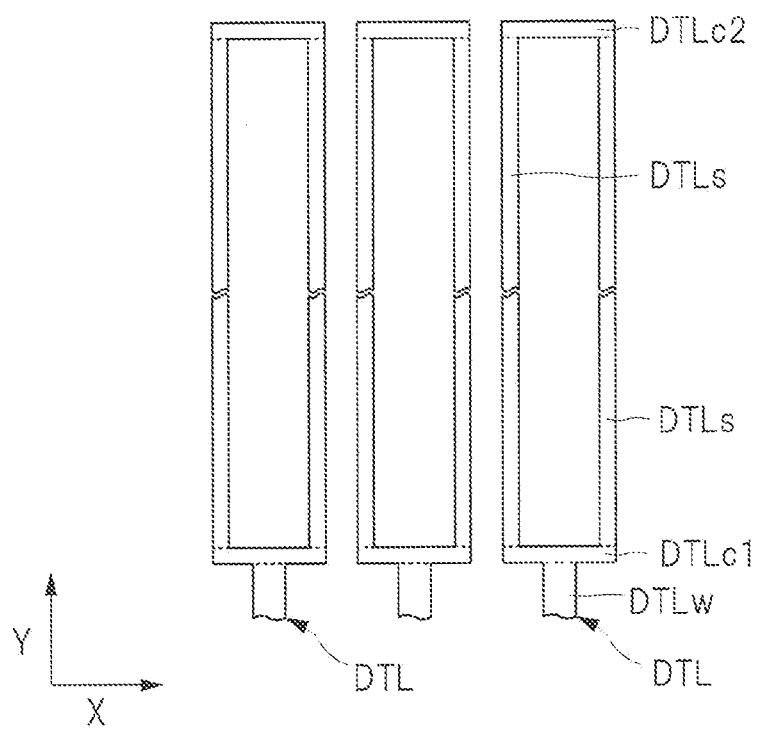
FIG. 16 is an enlarged plan view illustrating an overall structure of the detection electrode illustrated in FIG. 8.

In FIG. 8, among each of the plurality of detection electrodes DTL, one end of the plurality of electrode portions DTLs, that is, a vicinity of a part to be connected to the wiring portion DTLw is illustrated in an enlarged manner. From a view point of improving the detection accuracy in detecting the position of a signal input, it is preferred that each of the plurality of electrode portions DTLs constituting one detection electrode DTL be joined at both ends as illustrated in FIG. 16. FIG. 16 is an enlarged plan view illustrating an overall structure of the detection electrode illustrated in FIG. 8.

As illustrated in FIG. 16, each of the plurality of detection electrodes DTL according to this embodiment further includes a joining portion DTLc2 that is disposed on an opposite side of the joining portion DTLc1 along the Y axis direction and that connects the plurality of electrode portions DTLs with each other.

For the detection signal to be output from the detection electrode DTL, each of the plurality of electrode portions DTLs may be connected to the wiring portion DTLw at least at one part. For this reason, although illustration is omitted, as a modification to FIG. 16, at an end on an opposite side of an end connected to the wiring portion DTLw of each of the plurality of electrode portions DTLs, the plurality of electrode portions DTLs may not be joined with each other and may be terminated in a state separated from each other. That is, the detection signal is output from each of the plurality of detection electrodes DTL even in a structure in which the joining portion DTLc2 illustrated in FIG. 16 is removed.

In the example illustrated in FIG. 16, each of the plurality of electrode portions DTLs is connected to each other only at the ends in the Y axis direction. In other words, between the joining portion DTLc1 and the joining portion DTLc2 illustrated in FIG. 16, there is no joining portion disposed that connects the plurality of electrode portions DTLs with each other.

However, in a case where a signal is input in the vicinity of the joining portion DTLc2 illustrated in FIG. 16, compared to a case where a signal is input in the vicinity of the joining portion DTLc1, a distance from the input position to the wiring portion DTLw is longer, whereby the signal intensity tends to be relatively small. As illustrated in FIG. 16, by providing the joining portion DTLc2, it is possible to suppress a decrease in the signal intensity in the vicinity of the joining portion DTLc2.

By connecting the plurality of electrode portions DTLs by the plurality of joining portions DTLc1 and DTLc2, even in a case where the disconnection occurs at a part of the electrode portions DTLs, it is possible to suppress a decrease in the detection accuracy.

In this embodiment, as illustrated in FIGS. 5 and 7, the exemplary aspect in which each of the plurality of detection electrodes DTL is arrayed along the X axis direction has been described. In terms of the array direction of the detection electrode DTL, however, there are various modifications other than the example illustrated in FIGS. 5 and 7. For example, each of the plurality of detection electrodes DTL illustrated in FIG. 7 may be extended along the X axis direction and arrayed along the Y axis direction. In this case, it is preferred that each of the plurality of driving electrodes DRL be extended along the Y axis direction and arrayed along the X axis direction.

According to this embodiment, it is possible to improve the signal intensity of the detection signal when the input tool is disposed between the adjacent detection electrodes DTL in a plan view. For this reason, it is possible to suppress the erroneous detection of the input position in the array direction of the plurality of detection electrodes DTL (X axis direction in the example of this embodiment).

Second Embodiment

In the second embodiment, there is described a method of suppressing an erroneous detection of an input position in an array direction of a plurality of driving electrodes DRL (Y axis direction in the example illustrated in FIGS. 5 and 7) by devising a method of selecting the plurality of driving electrodes DRL by the input detection driver DR1 illustrated in FIG. 1.

Note that, in the second embodiment, a method of driving the plurality of driving electrodes DRL is different from the aspect described in the first embodiment; however, a structure of the input device is the same as that of the aspect described in the above-described first embodiment. Thus, in the second embodiment, a difference from the first embodiment is mainly described, and any duplicated description is omitted in principle. In the second embodiment, the drawings described in the first embodiment are referred to as necessary.

In the above-described first embodiment, there is described the method of suppressing the erroneous detection of the input position by devising the structure of the plurality of detection electrodes by increasing the minimum value of the signal intensity in the array direction of the plurality of detection electrodes DTL.

In this case, a method of selecting the plurality of driving electrodes DRL by the input detection driver DR1 illustrated in FIG. 1 is not particularly limited.

However, as illustrated in FIGS. 5 and 7, for example, in a case of a method of selecting the plurality of driving electrodes DRL arrayed along the Y axis direction one by one in order and of detecting presence or absence of an input signal in a range overlapping the driving electrode DRL that is selected, depending on magnitude of the separation distance between the adjacent driving electrodes DRL, there may be a part where the signal intensity of the detection signal becomes small in the Y axis direction. More specifically, in a case where the input tool is positioned to the intermediate position of the adjacent driving electrodes DRL in a plan view, compared to a case where the input tool is positioned at a position overlapping the driving electrode DRL, the signal intensity may decrease. Then, in the same way as the example of the detection electrodes DTL according to the above-described first embodiment, in a case where there is a coordinate position at which the signal intensity becomes small on a coordinate plane for specifying the input position, it may be a cause of decreasing the detection accuracy such as the erroneous detection.

Accordingly, in the second embodiment, there is described a driving method for suppressing the signal intensity from becoming relatively small in a case where the input tool is positioned at the intermediate position between the adjacent driving electrodes DRL.

<Scanning Driving Operation>

Figure 17:
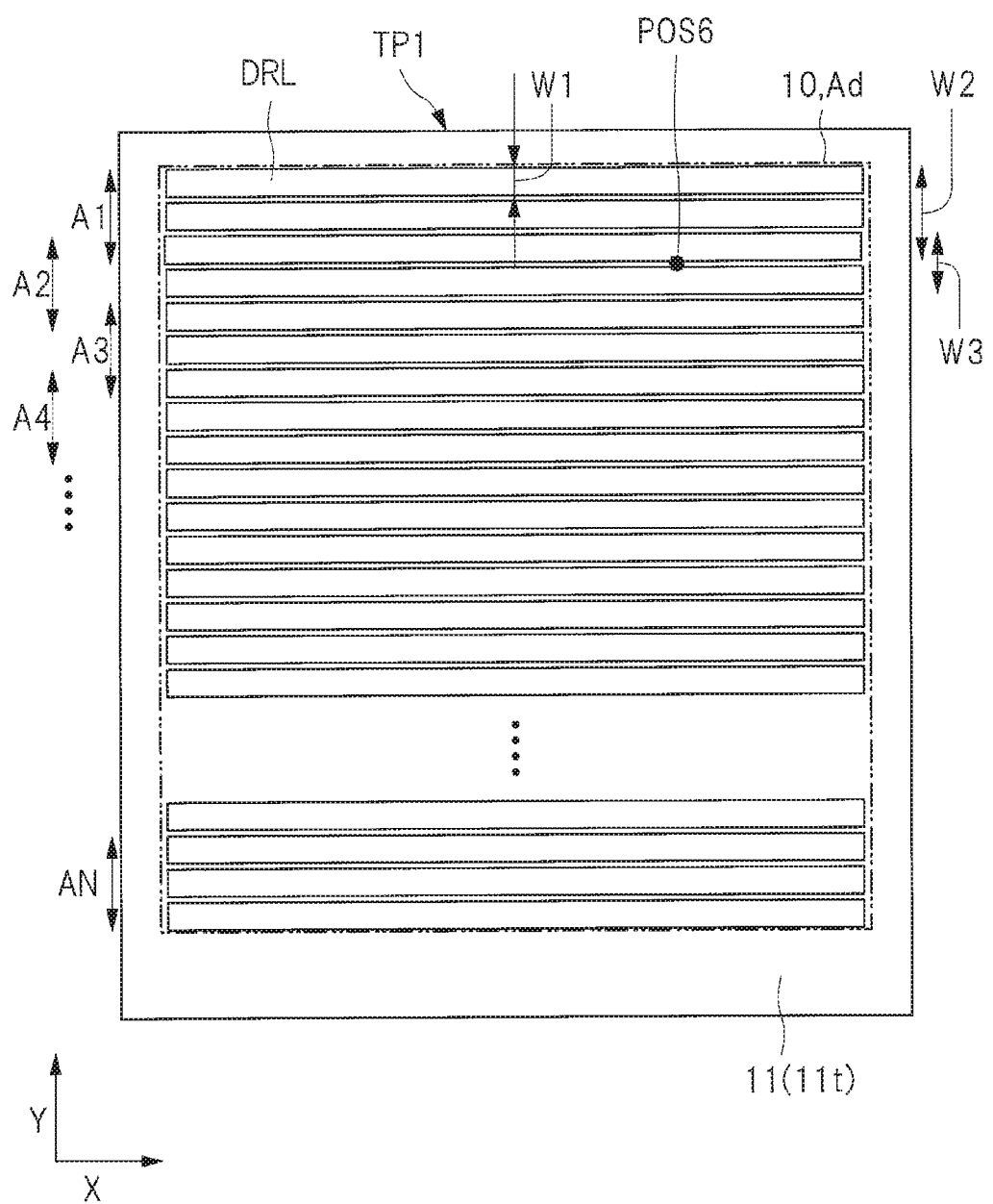
FIG. 17 is a plan view illustrating an arrangement of a driving electrode in an input device according to a second embodiment.

FIG. 17 is a plan view illustrating an arrangement of a driving electrode in an input device according to a second embodiment. FIGS. 18A and 18B are graphs illustrating an exemplary timing waveform of a driving signal and a detection signal of the input device illustrated in FIG. 17. FIG. 18A is a graph illustrating a waveform of the driving signal Vts, and FIG. 18B is a graph illustrating a waveform of the detection signal Vdet.

As illustrated in FIG. 17, the driving electrode DRL has a width equal to each other and is disposed in parallel. The input detection driver DR1 simultaneously drives the M (M 2) driving electrodes DRL (for example, a driving range A1). In the input detection unit 10, the driving signal Vts supplied to the M driving electrodes DRL is transmitted to the detection electrode DTL through electrostatic capacitance and is output as the detection signal Sdet. That is, a region corresponding to the M driving electrodes DRL (for example, the driving range A1) becomes an input detection region at the time on the input detection surface, and a width of the region (input detection width W2) is equal to a width of the M driving electrodes DRL.

Note that, in FIG. 17, the width of each of the plurality of driving electrodes DRL in the Y axis direction is referred to as a width W1.

The input detection driver DR1, in order of driving ranges A1, A2, A3, A4, and AN, performs a scanning operation in which the driving electrode DRL is scanned in a time division manner. In each of the scanning operations, the M (M 2) driving electrodes DRL disposed consecutively in the Y axis direction are selected, and a driving signal is supplied to each of the M driving electrodes DRL that is selected. The scanning operation is repeated multiple times by shifting each of the M driving electrodes DRL to be selected to a negative side in the Y axis direction by L (L 2). The number M is larger than the number L.

Hereinafter, as illustrated in FIG. 17, there is described an example in which the number M is three and the number L is two. However, the number M is not limited to three, and the number L is not limited to two. Thus, for example, the number M may also be five, and the number L may also be four.

In the example illustrated in FIG. 17, the input detection driver DR1 selects three driving electrodes DRL (input detection width W2) at a time, and it scans each of the three driving electrodes DRL that are selected by shifting by two (scanning pitch W3). The scanning pitch W3 is set by the number of the driving electrodes DRL in a part where the adjacent driving ranges (for example, the driving range A1 and the driving range A2) are overlapping with each other. The input detection width W2 may also be set by the number of the driving electrodes DRL in each of the driving ranges.

The scanning pitch W3 has a correlation with position resolution in detecting the touch position. That is, in general, it is possible to increase the position resolution by decreasing the scanning pitch W3. On the other hand, the input detection width W2 has a correlation with detection sensitivity of a touch. In general, it is possible to increase the detection sensitivity by increasing the input detection width W2. This is, by increasing the input detection width W2, the number of the electric lines of force from the driving electrodes DRL corresponding to the input detection width W2 increases according to an area thereof.

In the second embodiment, it is possible to independently set the scanning pitch W3 and the input detection width W2, whereby it is possible to independently set the position resolution in detecting the touch position and the detection sensitivity of the touch.

For example, to increase the position resolution while retaining the detection sensitivity, it is possible to do so by decreasing the scanning pitch W3 while retaining the input detection width W2. On the other hand, to increase the detection sensitivity while retaining the position resolution, for example, it is possible to do so by increasing the input detection width W2 while retaining the scanning pitch W3. To increase both of the position resolution and the detection sensitivity, for example, it is possible to do so by increasing the input detection width W2 while decreasing the scanning pitch W3.

Figure 18:
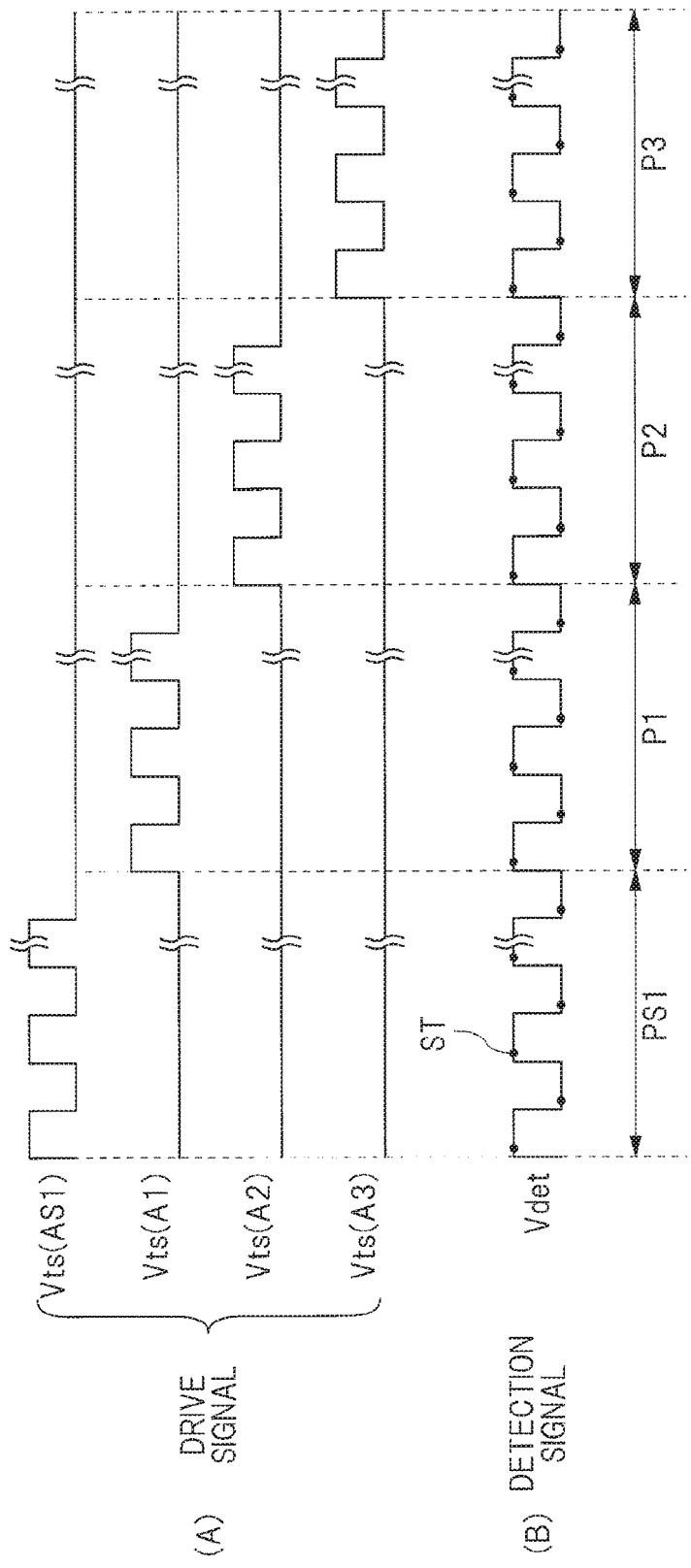
FIG. 18A is a graph illustrating an exemplary timing waveform of a driving signal of the input device illustrated in FIG. 17.
FIG. 18B is a graph illustrating an exemplary timing waveform of a detection signal of the input device illustrated in FIG. 17.

As illustrated in FIG. 18, the input detection driver DR1 (see FIG. 1) applies the driving signal Vts having a plurality of pulse waveforms to the driving electrodes DRL (see FIG. 17) in a time division manner for each of the driving ranges (FIG. 18A). The input detection unit 10 (see FIG. 17) outputs a signal based on the driving signal Vts (FIG. 18B). More specifically, as already described by using FIG. 3, the input detection unit 10 outputs the detection signal Sdet, and the detection signal Sdet is converted into the detection signal Vdet, which is the voltage waveform, in the voltage detector DET. Then, the detection circuit portion 20 separately analyses the detection signal Vdet of each of the driving ranges, and it detects presence or absence of a touch, a touch position, and the like. In a part where rectangular waveforms, or the pulse waveforms, are not applied, it is preferred that a fixed potential be applied and the potential be fixed. The fixed potential may be a ground potential or may be a potential different from the ground potential.

Specifically, during a period P1, the input detection driver DR1 (see FIG. 1) applies the driving signal Vts having the plurality of pulse waveforms (Vts (A1) in FIG. 18A) to the driving electrode DRL included in the driving range A1. In other words, the input detection driver DR1, which is the driving unit, performs driving operation for supplying the driving signal to each of the multiple driving electrodes DRL (three in the example illustrated in FIG. 17) selected from among the plurality of driving electrodes DRL. In the input detection unit 10 illustrated in FIG. 17, through the electrostatic capacitance between the driving electrode DRL in the driving range A1 and the detection electrode DTL, the driving signal Vts is transmitted to the detection electrode DTL, whereby the detection signal Vdet changes (FIG. 18B). The A/D converter 23 of the detection circuit portion 20 samples an output signal of the signal amplification unit 22, to which the detection signal Vdet is input, at a sampling timing ST corresponding to transition of the plurality of pulse waveforms of the driving signal Vts (FIG. 18B) and performs A/D conversion. Based on a plurality of A/D conversion results, the signal processing unit 24 obtains the presence or absence of the input signal, or in other words, the presence or absence of the touch by the input tool, in a region corresponding to the driving range A1. Note that the signal processing unit 24 may perform determination processing for determining the presence or absence of the input signal and may output a determination result or may calculate data for determining the presence or absence of the input signal and may output it.

In a period P2 or after as well, the input detection unit 10 performs the input detection in the same way as in the period P1. In other words, the input detection driver DR1, which is the driving unit, repeatedly performs the driving operation for supplying the driving signal to each of the multiple driving electrodes DRL (three in the example illustrated in FIG. 17) selected from among the plurality of driving electrodes DRL. For example, in the period P2, the input detection driver DR1 applies the driving signal Vts to the driving electrodes DRL included in the driving range A2 (Vts(A2) in FIG. 18A). In the input detection unit 10, through the electrostatic capacitance between the driving electrodes DRL included in the driving range A2 and the detection electrode DTL, the driving signal Vts is transmitted to the detection electrode DTL, and the detection signal Vdet changes (FIG. 18B). Then, the A/D converter 23 and the signal processing unit 24, based on this detection signal Vdet, obtains the presence or absence of the input signal in a region corresponding to the driving range A2.

In this way, by performing the above-described operation on the entire coordinate plane for which it is necessary to determine the presence or absence of the input signal (or, the driving operation and accompanying operation for processing detection signal), the signal processing unit 24 separately obtains the presence or absence of the touch within a region corresponding to each of the driving ranges. Then, based on an input detection result of all of the driving ranges, the coordinate extraction unit 25 of the detection circuit portion 20, for example, performs interpolation arithmetic by weighted mean and the like on a plurality of regions (positions) where the input signal is detected and detects the touch position (a coordinate at which the input signal is detected).

In the input detection unit 10 illustrated in FIG. 17, the input detection driver DR1 supplies the driving signal Vts having the plurality of pulse waveforms (see FIG. 18) to the driving electrode DRL in each of the driving ranges. Then, based on the detection signal Vdet output from the detection electrode DTL, the signal amplification unit 22, the A/D converter 23, and the signal processing unit 24 of the detection circuit portion 20 detect the presence or absence of the input signal in the region corresponding to each of the driving ranges. That is, the detection circuit portion 20 detects the presence or absence of the input signal based on the plurality of sampling results in the region corresponding to each of the driving ranges. Accordingly, it is possible to statistically analyze the sampled result, for example, by adding and averaging the plurality of data or by using a low pass filter such as the FIR, whereby it is possible to minimize deterioration of a signal-noise (S/N) ratio caused by a variation in the sampled results.

In the input detection unit 10, the input detection driver DR1 applies the driving signal Vts having the plurality of pulse waveforms to the driving electrode DRL for each of the regions corresponding to one driving range, and the signal amplification unit 22, the A/D converter 23, and the signal processing unit 24 of the detection circuit portion 20 detects the touch for each of the regions. It is also possible to perform averaging processing on the data detected by driving multiple times for each of the driving ranges by an analog circuit part such as the low pass filter or to perform averaging processing after the A/D conversion.

When the total number of the driving electrodes DRL in the input detection unit 10 is N1, the number of the driving electrodes DRL included in one driving range is M as described above, and the number of the driving electrodes DRL that is selected in each of the scanning operations and is shifted is L, when n is a natural number, preferably, $N1=L \times n+(M-L)$ is satisfied. Accordingly, after the last scanning operation of the scanning operations repeated multiple times is performed, the driving electrodes DRL in the number smaller than L do not remain, whereby no extra calculation is required, whereby it is possible to simplify algorithm for calculating the input position.

115 As illustrated in FIG. 18, in the first embodiment, before the input detection driver DR1 scans the driving electrodes DRL in the time division manner in the order of the driving range A1, A2, and A3, during a period PS1, the input detection driver DR1 supplies the driving signal to the driving electrode DRL at a starting end of the array constituted of the plurality of driving electrodes DRL in a driving range AS1. Although illustration is omitted in FIG. 18, after the input detection driver DR1 has scanned the driving electrode DRL in the time division manner, in the last period in which the repeated driving operations are performed, the input detection driver DR1 supplies the driving signal to the driving electrode DRL at a terminal end of the array constituted of the plurality of driving electrodes DRL.

By the driving method according to the second embodiment, among the plurality of driving ranges to be scanned in order, each of two adjacent driving ranges partly overlaps with each other. Thus, in a case where the driving operation is performed in order on the plurality of driving ranges that partly overlap with each other along the Y axis direction illustrated in FIG. 17, even when the input tool contacts with or approaches a boundary portion of one driving range, the input tool contacts with or approaches a part on a central part side of the boundary portion between the driving range and the adjacent driving range.

For example, a description is given in a case where the input tool is disposed to a coordinate POS6, which is schematically illustrated by adding a solid black circle in FIG. 17. In the period P1 (see FIG. 18) in which the driving operation is performed on the driving range A1, the coordinate POS6 is close to the boundary portion of the driving range A1, whereby the signal intensity becomes relatively small. However, in the period P2 (see FIG. 18) in which the driving operation is performed on the driving range A2, the coordinate POS6 is close to the central part of the driving range A2, whereby the signal intensity is larger than that in the period P1. Then, in a period P3 (see FIG. 18) in which the driving operation is performed on the driving range A3, the coordinate POS6 is disposed to a position not overlapping with the driving range A3, whereby the signal intensity is further smaller than that in the period P1.

In this way, according to the second embodiment, since the driving ranges overlap with each other, it is possible to suppress the signal intensity of the detection signal from decreasing.

According to the second embodiment, as described above, it is possible to independently set the scanning pitch W3 and the input detection width W2. For this reason, it is possible to independently set the position resolution in detecting the touch position and the detection sensitivity of the touch. For example, in the example illustrated in FIG. 17, a width (input detection width W2) of one driving range in the Y axis direction is set to 6 mm, and a pitch (scanning pitch W3) of the driving range is set to 4 mm. In this case, the position resolution of the input position to be detected is the position resolution corresponding to the pitch of 4 mm, and the detection sensitivity of the touch is the detection sensitivity corresponding to the width of 6 mm.

In the example illustrated in FIG. 18, the intensity of the driving signal Vts supplied to the plurality of driving electrodes DRL (see FIG. 17), which is included in one driving range and is disposed consecutively in the Y axis direction (see FIG. 17), is equal to each other. Accordingly, it is possible to simplify the scanning operation.

Note, however, that as a modification to the example illustrated in FIG. 18, it is also possible to supply the driving signals Vts each having different intensity to each of the plurality of driving electrodes DRL disposed consecutively in the Y axis direction. For example, in the array constituted of the plurality of driving electrodes consecutively disposed and included in one driving range, intensity of the driving signal supplied to the driving electrode disposed to the central part of the array may be smaller than intensity of the driving signal supplied to the driving electrodes disposed to both ends thereof or may be zero.

Third Embodiment

In the first embodiment and the second embodiment as well as the modifications of each of the embodiments, the aspect applied to the input device of the mutual capacitance type among the electrostatic capacitance type input devices has been described. In the third embodiment, an aspect applied to the input device of the self-capacitance type is described.

Note that the third embodiment is different from the aspect described in the first embodiment in that a signal is detected by the self-capacitance type; however, any other point except for the type, which is the electrostatic capacitance type, is the same as the aspect described in the first embodiment. Thus, in the third embodiment, a difference from the first embodiment is mainly described, and any duplicated description is omitted in principle. In the third embodiment, the drawings described in the first embodiment are referred to as necessary.

Figure 19:
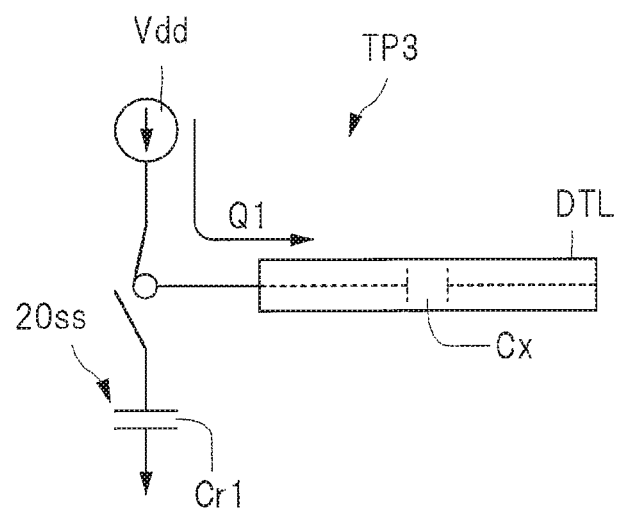
FIG. 19 is an explanatory drawing illustrating an electrical connection state of a self-capacitance type detection electrode.
Figure 20:
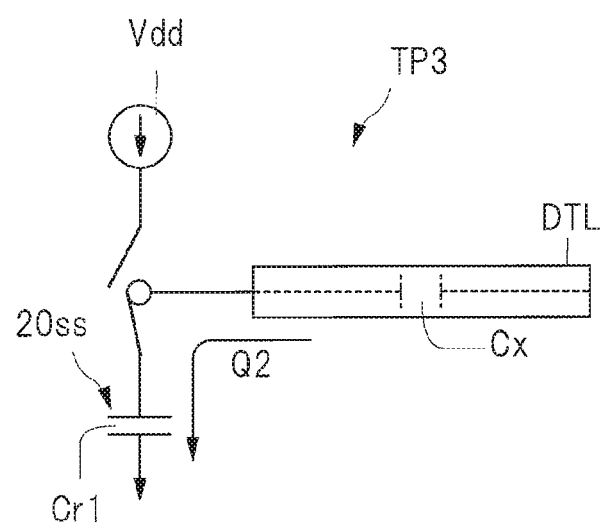
FIG. 20 is an explanatory drawing illustrating an electrical connection state of the self-capacitance type detection electrode.

FIG. 19 is an explanatory drawing illustrating an electrical connection state of a self-capacitance type detection electrode, and FIG. 20 is an explanatory drawing illustrating an electrical connection state of the self-capacitance type detection electrode.

In an input device TP3 of the self-capacitance type, as illustrated in FIG. 19, when the detection electrode DTL having an electrostatic capacitance Cx is disconnected from a detection circuit portion 20$ss$ having an electrostatic capacitance Cr1 and is electrically connected to a power supply Vdd, a charge amount Q1 is accumulated in the detection electrode DTL having the electrostatic capacitance Cx. Next, as illustrated in FIG. 20, when the detection electrode DTL having the electrostatic capacitance Cx is disconnected from the power supply Vdd and is electrically connected to the detection circuit portion 20$ss$ having the electrostatic capacitance Cr1, a charge amount Q2 flowed out to the detection circuit portion 20$ss$ is detected.

Here, in a case where a finger contacts with or approaches the detection electrode DTL, the electrostatic capacitance Cx of the detection electrode DTL changes due to capacitance of the finger, and the charge amount Q2 flowed out to the detection circuit portion 20$ss$ when the detection electrode DTL is connected to the detection circuit portion 20$ss$ also changes. Thus, by measuring the charge amount Q2 flowed out by the detection circuit portion 20$ss$ and by detecting a change in the electrostatic capacitance Cx of the detection electrode DTL, it is possible to determine whether or not the finger contacts with or approaches the detection electrode DTL.

In an input device such as the input device TP3, which detects input of a signal by the self-capacitance type, for example, in a case where it is only necessary to specify a coordinate in the X axis direction illustrated in FIG. 5 for a position where the input signal is detected, it is not necessary to form the driving electrode DRL illustrated in FIG. 5. It is also possible that the input device TP3 include the plurality of detection electrodes DTL each extending in the X axis direction (see FIG. 5) and arrayed in the Y axis direction (see FIG. 5) at an interval, and the plurality of detection electrodes DTL each extending in the Y axis direction and is arrayed in the X axis direction at an interval. In this case, it is possible to two-dimensionally detect the input position by detecting the change in the electrostatic capacitance Cx of the plurality of detection electrodes DTL extending in each direction.

In the input device TP3, in a case where a structure of each of the plurality of detection electrodes DTL is the structure described in the first embodiment and each of the modifications, it is possible to suppress the signal intensity of the detection signal from decreasing among the plurality of detection electrodes DTL. For this reason, it is possible to improve detection accuracy of the input device TP3.

Fourth Embodiment

In the first, second, and third embodiments as well as the modifications of the embodiments, as the example of the input device, descriptions have been given by using the aspects applied to an input device part provided to the on-cell type display device. The above-described technique, however, can also be applied to the in-cell type display device. In the fourth embodiment, an aspect applied to the in-cell type display device is described.

Note that the fourth embodiment is different from the touch panel module TPM1 (see FIG. 5) described in the first embodiment in that the fourth embodiment is used in a state where all or part of components constituting the input detection unit 10 (see FIG. 1), which detects an input signal, are incorporated between the components constituting the display unit, which displays an image. However, a structure of the plurality of detection electrodes DTL is the same as the structure of the input device TP1 (see FIG. 8) and the input device TP2 (see FIG. 14) described in the first embodiment. A method of driving the plurality of driving electrodes DRL per a period of detecting an input position is the same as the driving method described in the first embodiment and the driving method described in the second embodiment. In the in-cell type display device, it is also possible to use the self-capacitance type described in the third embodiment. Thus, in the fourth embodiment, a difference from the first embodiment is mainly described, and any duplicated description is omitted in principle. In the fourth embodiment, the drawings described in the first embodiment are referred to as necessary.

Figure 21:
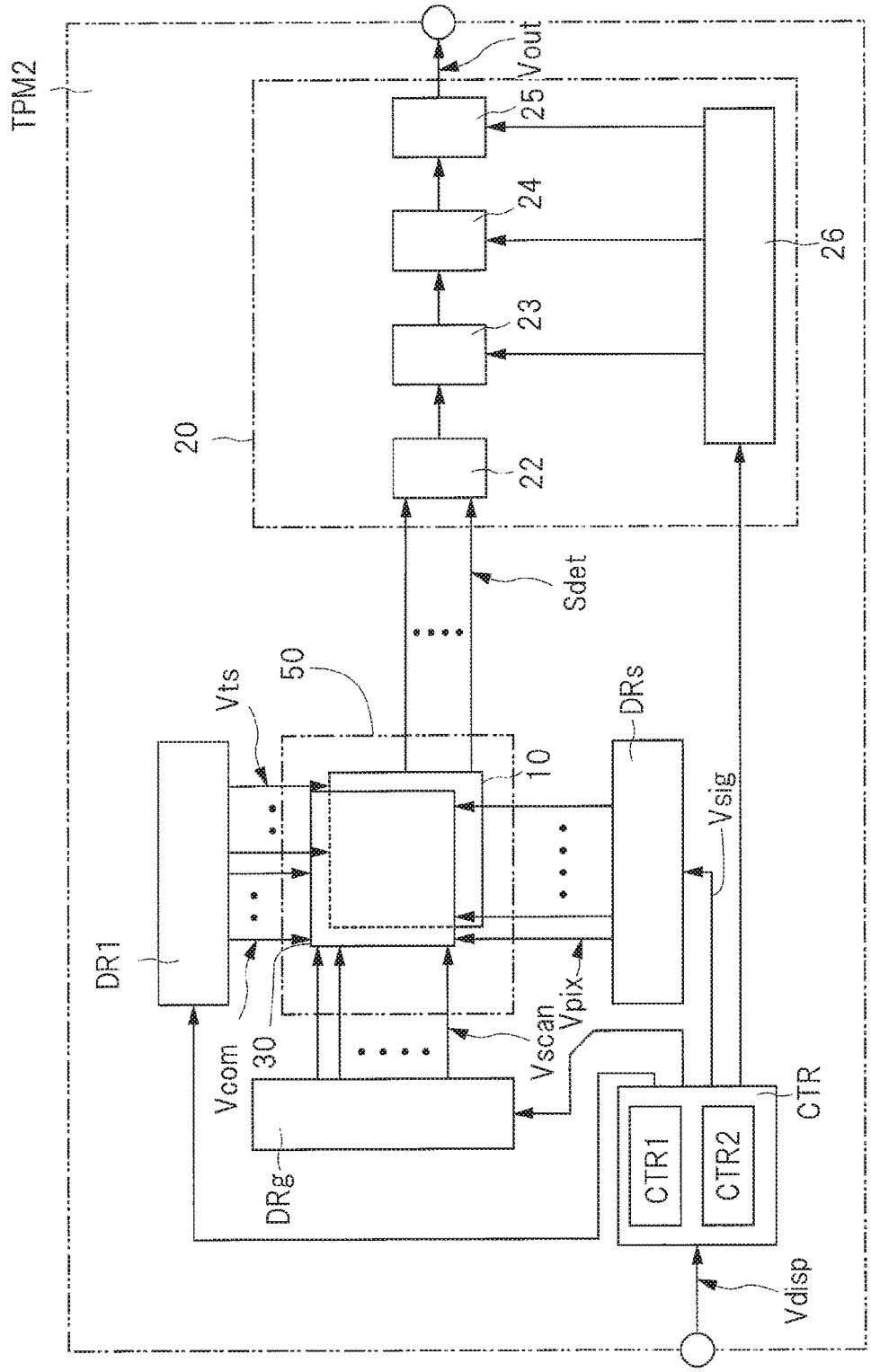
FIG. 21 is a block diagram illustrating an exemplary configuration of a touch panel module that is a display device with an input detection function according to a fourth embodiment.

FIG. 21 is a block diagram illustrating an exemplary configuration of a touch panel module that is a display device with an input detection function according to a fourth embodiment.

A display device TPM2, which is a touch panel module, includes a main body unit 50 provided with the input detection unit 10, which outputs the signal that is input as the detection signal Sdet, and a display unit 30, which displays an image based on a video signal Vdisp input from the outside. The display device TPM2 also includes a plurality of circuit portions connected to the input detection unit 10 and the display unit 30, which are provided to the main body unit 50.

Among the plurality of circuit portions, there are the input detection driver DR1 and the detection circuit portion 20 described in detail in the first embodiment. Among the plurality of circuit portions, there are also included a gate driver DRg and a source driver DRs, which drive the display unit 30. Among the plurality of circuit portions, there is also a control unit CTR provided with a control unit CTR1, which controls the input detection unit 10, and a control unit CTR2, which controls the display unit 30. Note that, in FIG. 1, the example is illustrated in which the control unit CTR1 and the control unit CTR2 are included in one control unit CTR; however, it is also possible to form each of the control unit CTR1 and the control unit CTR2 in a different device.

In this fourth embodiment, as one example of the display unit 30, a display device using a liquid crystal display element as a display element is described. Thus, hereinafter, the display unit 30 may be referred to as the liquid crystal display device. The input detection unit 10, as described in the above-described first embodiment, is the input device of the electrostatic capacitance type input device. Thus, the display device TPM2 is the display device provided with the input device having the input detection function. The main body unit 50 is the display device in which the display unit 30 and the input detection unit 10 are integrated, whereby it is the display device incorporating the input detection function, that is, the in-cell type display device with the input detection function.

Note that the display unit 30 may also be, for example, an organic electroluminescence (EL) display device in place of the display device using the liquid crystal display element.

The display unit 30 performs display by scanning one horizontal line in order in a display area by following a scanning signal Vscan supplied from the gate driver DRg.

The control unit CTR2 is a circuit that supplies a control signal based on the video signal Vdisp supplied from the outside to each of the gate driver DRg, the source driver DRs, the input detection driver DR1, and the detection circuit portion 20 so as to control these circuits operate in synchronization with each other.

The gate driver DRg has a function to select one horizontal line, which is a target of display driving of the main body unit 50, in order based on the control signal supplied from the control unit CTR2.

The source driver DRs is a circuit that supplies a pixel signal Vpix to a subpixel SPix included in the main body unit 50 based on a control signal of a video signal Vsig (see FIG. 24 described below) supplied from the control unit CTR2.

In the example of this embodiment, the plurality of driving electrodes DRL (see FIG. 24 described below) are used as electrodes to which the driving signal is supplied when detecting the input signal and are also used as electrodes to which a driving signal Vcom is supplied when the display unit 30 performs display. In the example illustrated in FIG. 21, the input detection driver DR1 is used as a driving unit that supplies the driving signal Vcom and the driving signal Vts.

In this way, in a case where the driving signal Vcom for displaying and the driving signal Vts for input detecting are supplied to the plurality of driving electrodes DRL, for example, one frame may be time divided between a display period and an input detection period, and the driving signal Vcom for displaying may be supplied during the display period while the driving signal Vts for input detecting may be supplied during the input detection period.

<Touch Panel Module>

Figure 22:
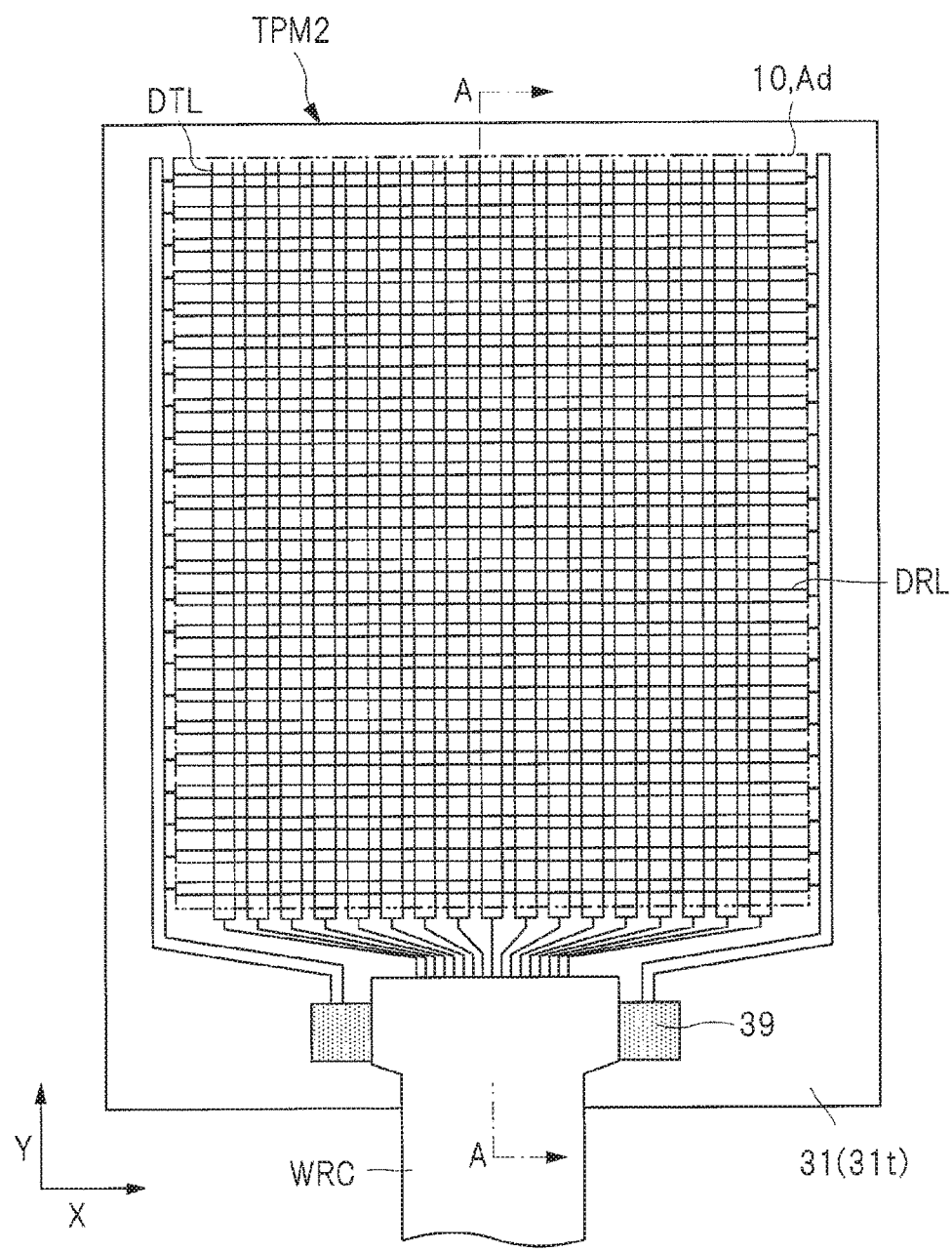
FIG. 22 is an enlarged plan view illustrating an exemplary structure of the touch panel module illustrated in FIG. 21.
Figure 23:
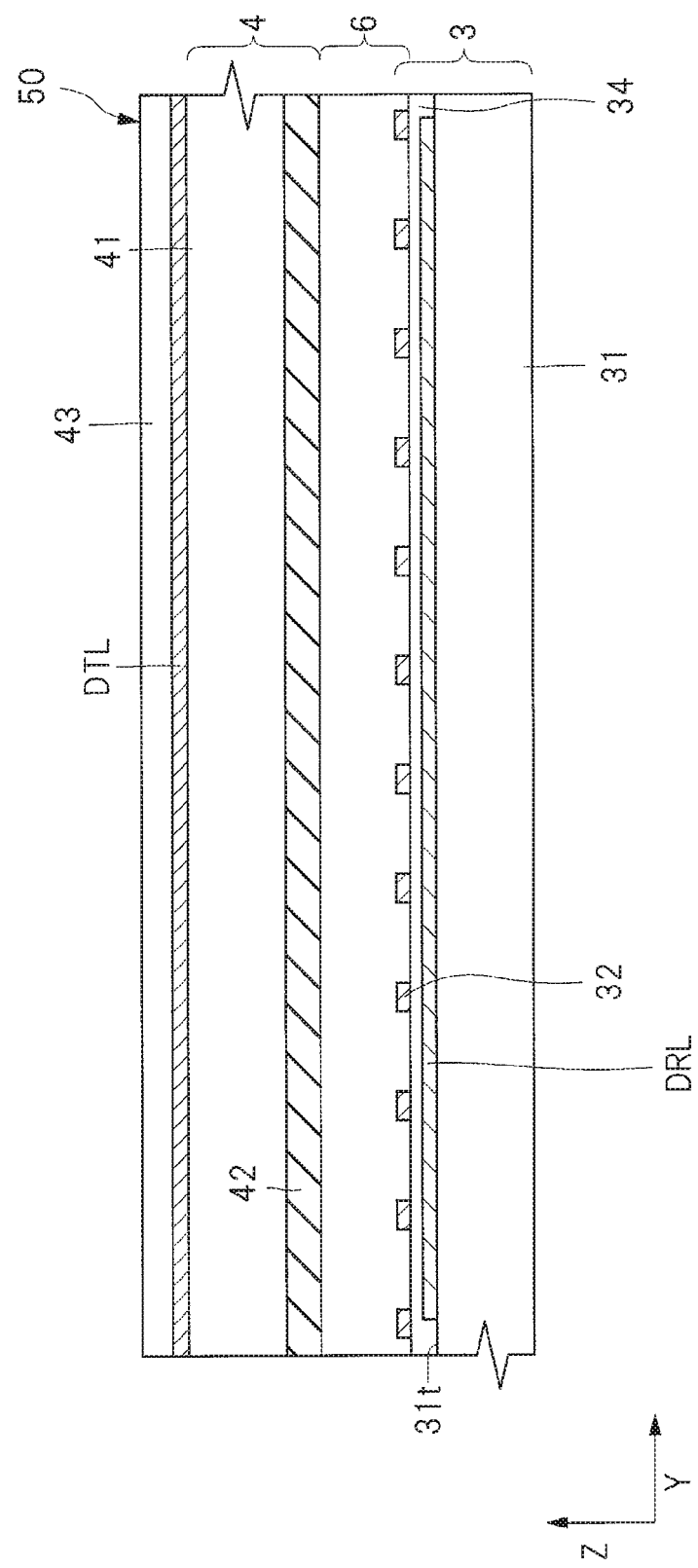
FIG. 23 is an enlarged sectional view schematically illustrating a configuration of a main body of the touch panel module illustrated in FIG. 22.
Figure 24:
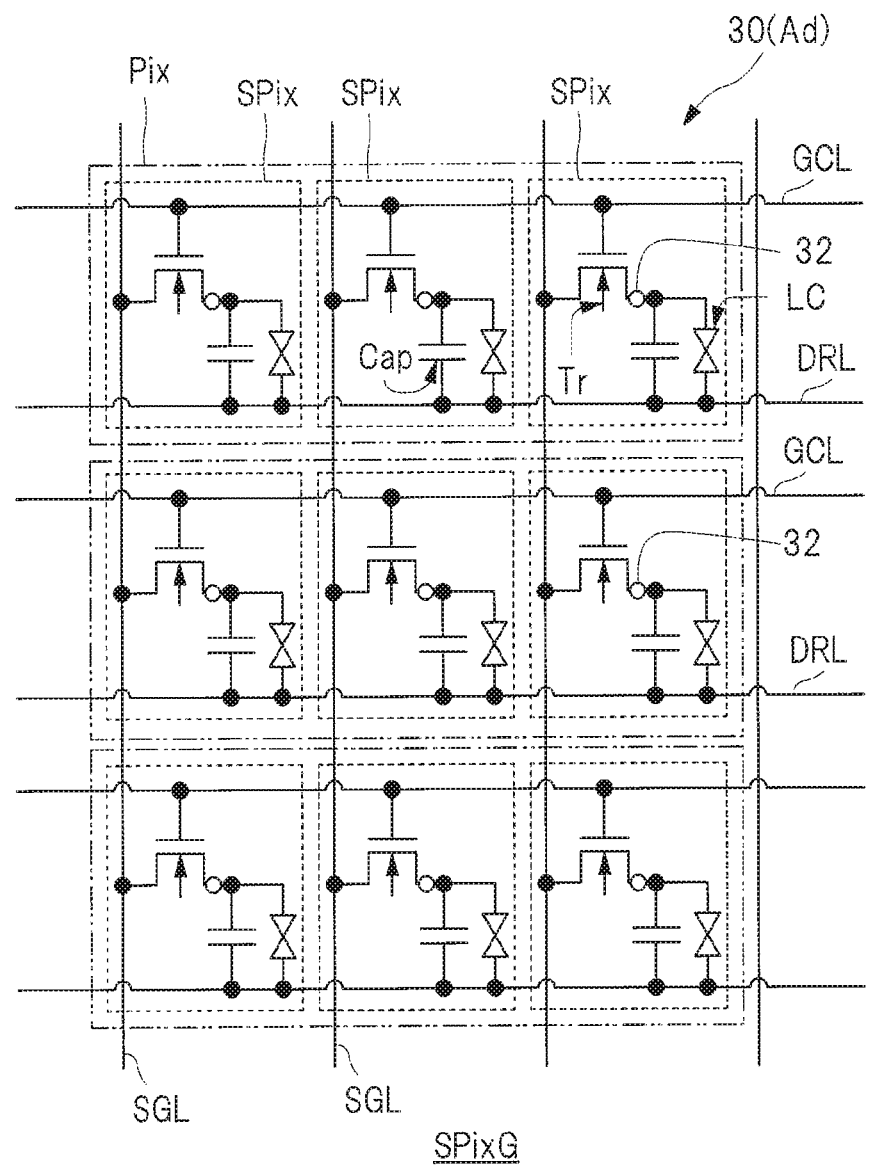
FIG. 24 is a circuit diagram illustrating an exemplary circuit that drives a display unit illustrated in FIG. 21.

Next, with reference to FIGS. 22 to 24, an exemplary configuration of the input detection unit 10 is described in detail. FIG. 22 is an enlarged plan view illustrating an exemplary structure of the touch panel module illustrated in FIG. 21. FIG. 23 is an enlarged sectional view schematically illustrating a configuration of a main body of the touch panel module illustrated in FIG. 22. FIG. 24 is a circuit diagram illustrating an exemplary circuit that drives a display unit illustrated in FIG. 21.

As illustrated in FIG. 22, the display device TPM2, which is the touch panel module, includes the input detection unit 10, a chip on glass (COG) 39, and a substrate 31. The COG 39 is a semiconductor chip mounted on the substrate 31, and it incorporates each of the circuits necessary for display operation such as the control unit CTR2, the gate driver DRg, and the source driver DRs illustrated in FIG. 21. Note that the COG 39 may also incorporate the input detection driver DR1.

The input detection unit 10 includes the plurality of driving electrodes DRL and the plurality of detection electrodes DTL. Here, two directions that cross each other, or preferably, that cross orthogonally to each other, within an upper surface as a principal surface of the substrate 31 are referred to as the X axis direction and the Y axis direction. At this time, the plurality of driving electrodes DRL extend in the X axis direction and is arrayed in the Y axis direction. The plurality of detection electrodes DTL extend in the Y axis direction and are arrayed in the X axis direction in a plan view. That is, each of the plurality of detection electrodes DTL crosses the plurality of driving electrodes DRL in a plan view. Note that a region in which the input detection unit 10 is formed is the same region as the display area Ad where the image is displayed.

In the example illustrated in FIG. 23, the detection electrode DTL is formed on a substrate 41 of an opposing substrate 4. In the example illustrated in FIG. 23, the substrate 41 has two principal surfaces positioned on mutually opposite sides. A color filter 42 is provided to the principal surface on a liquid crystal layer 6 side, and the detection electrode DTL is provided to the principal surface on an opposite side of the liquid crystal layer 6 side. Note, however, that there are various modifications of the position to provide the detection electrode DTL, and it is not limited to the example illustrated in FIG. 23.

As illustrated in FIG. 24, each of the plurality of driving electrodes DRL is provided so as to overlap with the plurality of subpixels SPix arrayed in the X axis direction in a plan view. That is, one driving electrode DRL is provided as a common electrode for the plurality of subpixels SPix.

As illustrated in FIG. 23, the display device TPM2 includes an array substrate 3, the opposing substrate 4, and the liquid crystal layer 6. The opposing substrate 4 is facingly disposed with the array substrate 3 such that an upper surface as the principal surface of the array substrate 3 faces a lower surface as the principal surface of the opposing substrate 4. The liquid crystal layer 6 is provided between the array substrate 3 and the opposing substrate 4. That is, the liquid crystal layer 6 is sandwiched between an upper surface of the substrate 31 and a lower surface of the substrate 41.

The array substrate 3 includes the substrate 31. The opposing substrate 4 includes the substrate 41. The substrate 41 has the upper surface as one principal surface and the lower surface as the other principal surface on the opposite side of the upper surface, and the substrate 41 is facingly disposed with the substrate 31 such that the upper surface as the principal surface of the substrate 31 faces the lower surface as the principal surface of the substrate 41.

As illustrated in FIG. 24, in the display area Ad, a plurality of scanning lines GCL, a plurality of signal wires SGL, and a plurality of TFT elements Tr, each of which is a thin film transistor (TFT), are formed on the substrate 31 (see FIG. 23). Note that, in FIG. 23, illustration of the scanning lines GCL, the signal wires SGL, and the TFT elements Tr is omitted. Note also that the scanning line means gate wiring, and the signal wire means source wiring.

As illustrated in FIG. 24, each of the plurality of scanning lines GCL extends in the X axis direction and is arrayed in the Y axis direction within the display area Ad. Each of the plurality of signal wires SGL extends in the Y axis direction and is arranged in the X axis direction within the display area Ad. Thus, each of the plurality of signal wires SGL crosses the plurality of scanning lines GCL in a plan view. In this way, in a plan view, the subpixel SPix is disposed to an intersection point of the plurality of scanning lines GCL and the plurality of signal wires SGL, which cross each other. One pixel Pix is formed of the plurality of subpixels SPix having different colors. That is, the plurality of subpixels SPix are provided on an upper surface 31t (see FIGS. 22 and 23), which is one of the principal surfaces of the substrate 31, and it is disposed within the display area Ad and is arrayed in a matrix in the X axis direction and the Y axis direction in a plan view. The plurality of subpixels SPix constitute a pixel group SPixG. That is, the pixel group SPixG is constituted of the plurality of subpixels SPix provided on the substrate 31.

In a plan view, the TFT element Tr is formed at an intersection portion where each of the plurality of scanning lines GCL crosses each of the plurality of signal wires SGL. Thus, within the display area Ad, the plurality of TFT elements Tr are formed on the substrate 31 (see FIG. 23), and the plurality of TFT elements Tr are arrayed in a matrix in the X axis direction and the Y axis direction. That is, each of the plurality of subpixels SPix is provided with the TFT element Tr. To each of the plurality of subpixels SPix, a liquid crystal element LC is also provided in addition to the TFT element Tr.

The TFT element Tr is constituted of, for example, a thin film transistor as a metal oxide semiconductor (MOS) of an n-channel type. A gate electrode of the TFT element Tr is connected to the scanning line GCL. One of a source electrode or a drain electrode of the TFT element Tr is connected to the signal wire SGL. The other of the source electrode or the drain electrode of the TFT element Tr is connected to one end of the liquid crystal element LC. The liquid crystal element LC is connected, for example, to the source electrode or the drain electrode of the TFT element Tr at one end thereof and to the driving electrode DRL at the other end thereof.

As illustrated in FIG. 23, the array substrate 3 has the substrate 31, the plurality of driving electrodes DRL, an insulation film 34, and a plurality of pixel electrodes 32. The plurality of driving electrodes DRL, in a plan view, inside the display area Ad, are provided on the upper surface as one of the principal surfaces of the substrate 31. Including each of the surfaces of the plurality of driving electrodes DRL, the insulation film 34 is formed on the upper surface of the substrate 31. In the display area Ad, the plurality of pixel electrodes 32 are formed on the insulation film 34. Thus, the insulation film 34 electrically insulates the driving electrodes DRL and the pixel electrodes 32.

As illustrated in FIG. 24, in a plan view, each of the plurality of pixel electrodes 32 is formed inside each of the plurality of subpixels SPix arrayed in a matrix in the X axis direction and the Y axis direction inside the display area Ad. Thus, the plurality of pixel electrodes 32 are arrayed in a matrix in the X axis direction and the Y axis direction.

In an example illustrated in FIG. 23, each of the plurality of driving electrodes DRL is formed between the substrate 31 and the pixel electrodes 32. As schematically illustrated in FIG. 24, each of the plurality of driving electrodes DRL is provided so as to overlap with the plurality of pixel electrodes 32 in a plan view. Then, a voltage is applied between each of the plurality of pixel electrodes 32 and each of the plurality of driving electrodes DRL, and an electric field is formed between each of the plurality of pixel electrodes 32 and each of the plurality of driving electrodes DRL, that is, to the liquid crystal element LC provided to each of the plurality of subpixels SPix, whereby an image is displayed on the display area Ad. At this time, a capacitance Cap is formed between the driving electrodes DRL and the pixel electrodes 32, and the capacitance Cap functions as a holding capacitor.

The display unit 30 as a display control unit for controlling display of an image is formed of the liquid crystal element LC, the plurality of pixel electrodes 32, the driving electrode DRL, the plurality of scanning lines GCL, and the plurality of signal wires SGL. The display unit 30 as the display control unit, by controlling a voltage applied between each of the plurality of pixel electrodes 32 and each of the plurality of driving electrodes DRL, controls display of the image within the display area Ad. The display unit 30 as the display control unit is provided between the substrate 31 and the substrate 41.

Note that each of the plurality of driving electrodes DRL may also be formed on an opposite side of the substrate 31 interposing the pixel electrodes 32. In the example illustrated in FIG. 23, arrangement of the driving electrodes DRL and the pixel electrodes 32 is in a fringe field switching (FFS) mode as a horizontal electric field mode in which the driving electrodes DRL and the pixel electrodes 32 are overlapped in a plan view. However, the arrangement of the driving electrodes DRL and the pixel electrodes 32 may also be the arrangement in an in plane switching (IPS) mode as the horizontal electric field mode in which the driving electrodes DRL and the pixel electrodes 32 are not overlapped in a plan view. Moreover, the arrangement of the driving electrodes DRL and the pixel electrodes 32 may also be in a twisted nematic (TN) mode or in a vertical alignment (VA) mode as a vertical electric field mode.

The liquid crystal layer 6 modulates light that passes therethrough according to the state of an electric field, and for example, a liquid crystal layer capable of dealing with the horizontal electric field mode such as the above described FFS mode and the IPS mode is used. That is, as the display unit 30, the liquid crystal display device in the horizontal electric field mode such as the FFS mode and the IPS mode is used. Moreover, as described above, the liquid crystal display device in the vertical electric field mode such as the TN mode and the VA mode may also be used. Note that an oriented film may be provided between the liquid crystal layer 6 and the array substrate 3 or between the liquid crystal layer 6 and the opposing substrate 4 illustrated in FIG. 23.

As illustrated in FIG. 24, the plurality of subpixels SPix arrayed in the X axis direction, that is, the plurality of subpixels SPix belonging to the same row of the display unit 30 are connected to each other by the scanning line GCL. The scanning line GCL is connected to the gate driver DRg (see FIG. 21) and is supplied with the scanning signal Vscan by the gate driver DRg (see FIG. 21). The plurality of subpixels SPix arrayed in the Y axis direction, that is, the plurality of subpixels SPix belonging to the same column of the display unit 30 are mutually connected by the signal wire SGL. The signal wire SGL is connected to the source driver DRs (see FIG. 1) and is supplied with the pixel signal Vpix by the source driver DRs (see FIG. 1). Furthermore, the plurality of subpixels SPix arrayed in the X axis direction, that is, the plurality of subpixels SPix belonging to the same row of the display unit 30 are mutually connected by the driving electrode DRL.

The driving electrode DRL is connected to the input detection driver DR1 (see FIG. 21), and during the display period in which the display unit 30 displays an image, is supplied with the driving signal Vcom (see FIG. 21) by the input detection driver DR1. That is, in the example illustrated in FIG. 24, the plurality of subpixels SPix belonging to the same row share the one driving electrode DRL. Each of the plurality of driving electrodes DRL extends in the X axis direction and is arrayed in the Y axis direction within the display area Ad. As described above, each of the plurality of scanning lines GCL extends in the X axis direction and is arrayed in the Y axis direction within the display area Ad, whereby a direction in which each of the plurality of driving electrodes DRL extends is in parallel with a direction in which each of the plurality of scanning lines GCL extends. Note, however, that the direction in which each of the plurality of driving electrodes DRL extends is not limited, and for example, the direction in which each of the plurality of driving electrodes DRL extends may be a direction in parallel with a direction in which each of the plurality of signal wires SGL extends.

The gate driver DRg illustrated in FIG. 21, by applying the scanning signal Vscan to the gate electrode of the TFT element Tr of each of the subpixels SPix through the scanning line GCL illustrated in FIG. 24, selects, in order, one row among the subpixels SPix formed in a matrix in the display unit 30, that is, one horizontal line as a display drive target. The source driver DRs illustrated in FIG. 1 supplies the pixel signal Vpix to the plurality of subpixels SPix constituting the one horizontal line selected in order by the gate driver DRg through the signal wire SGL illustrated in FIG. 24. Then, display according to the pixel signal Vpix that is supplied is performed in the plurality of subpixels SPix constituting the one horizontal line.

During the display period, the input detection driver DR1 illustrated in FIG. 21 applies the driving signal Vcom and drives the driving electrode DRL for each driving range including one or multiple driving electrodes DRL.

In the display unit 30, by the gate driver DRg driving the scanning line GCL so as to scan, in order, in a time division manner, the subpixel SPix is selected, in order, per the one horizontal line. In the display unit 30, the source driver DRs supplies the pixel signal Vpix to the subpixel SPix belonging to the one horizontal line, whereby display is performed per the one horizontal line. When performing this display operation, the input detection driver DR1 supplies the driving signal Vcom to the driving electrode DRL included in the driving range corresponding to the one horizontal line.

The driving electrode DRL of the input device TP1 according to the first embodiment operates as the driving electrode of the display unit 30, and also operates as the driving electrode of the display device TPM2. FIG. 7 is a perspective view illustrating one exemplary configuration of the driving electrode and the detection electrode of the display device according to the first embodiment.

As illustrated in FIGS. 22 and 23, the opposing substrate 4 includes the substrate 41, the color filter 42, the detection electrode DTL, and a polarizing plate 43. The color filter 42 is formed on a lower surface of the substrate 41. The detection electrode DTL is the detection electrode of the display device TPM2 and is formed on an upper surface as the other principal surface of the substrate 41. The polarizing plate 43 is provided on the detection electrode DTL.

The display device TPM2 includes the plurality of driving electrodes DRL provided on the array substrate 3, and the plurality of detection electrodes DTL provided on the opposing substrate 4. Each of the plurality of detection electrodes DTL extends in a direction of crossing the direction in which each of the plurality of driving electrodes DRL extends in a plan view. In other words, each of the plurality of detection electrodes DTL is arrayed at an interval from each other so as to cross the plurality of driving electrodes DRL in a plan view. Then, each of the plurality of detection electrodes DTL face each of the plurality of driving electrodes DRL in a direction perpendicular to the upper surface of the substrate 31 included in the array substrate 3.

In other words, each of the plurality of driving electrodes DRL is overlapped with the pixel group SPixG (see FIG. 24) in a plan view. Each of the plurality of detection electrodes DTL is also overlapped with the pixel group SPixG (see FIG. 24) in a plan view.

Each of the plurality of detection electrodes DTL is connected to the signal amplification unit 22 of the detection circuit portion 20 (see FIG. 1). At an intersection portion of each of the plurality of driving electrodes DRL and each of the plurality of detection electrodes DTL, the electrostatic capacitance is generated in a plan view. The input position is detected based on the electrostatic capacitance between each of the plurality of driving electrodes DRL and each of the plurality of detection electrodes DTL. That is, the detection circuit portion 20 detects the input position based on the electrostatic capacitance between the plurality of driving electrodes DRL and the plurality of detection electrodes DTL.

With such configuration, in the display device TPM2, when performing the input detection operation, for example, one or multiple driving electrodes DRL is selected in order by the input detection driver DR1 (see FIG. 21). Then, the driving signal Vts is supplied and is input to the selected one or multiple driving electrodes DRL, and the detection signal vdet for detecting the input position is generated and is output from the detection electrode DTL. In this way, in the display device TPM2, the input detection is performed for each of the driving range including the one or multiple driving electrodes DRL that are selected. The one or multiple driving electrodes DRL included in the one driving range corresponds to the driving electrode E1 according to the above-described input detection principle, and the detection electrode DTL corresponds to the detection electrode E2.

As illustrated in FIG. 7, in a plan view, the plurality of driving electrodes DRL and the plurality of detection electrodes DTL that cross each other form the electrostatic capacitance type touch sensor arrayed in a matrix. Thus, by scanning the entire input detection surface of the display device TPM2, it is possible to detect the position in which the finger and the like have contacted or approached.

As the color filter 42, for example, a color filter colored in three colors of red (R), green (G), and blue (B) is arrayed in the X axis direction. Accordingly, as illustrated in FIG. 24, each of the plurality of subpixels SPix corresponding to each of colored regions of the three colors of R, G, and B is formed, and one pixel Pix is formed of the plurality of subpixels SPix corresponding to each of a pair of the colored regions. The pixel Pix is arrayed in a matrix along a direction in which the scanning line GCL extends (X axis direction) as well as along a direction in which the signal wire SGL extends (Y axis direction). The region in which the pixel Pix is arrayed in a matrix is, for example, the display area Ad described above.

As a color combination of the color filter 42, it is also possible to combine the plurality of colors including colors other than R, G, and B. The color filter 42 may not be provided as well. Moreover, the one pixel Pix may also include the subpixel SPix not provided with the color filter 42, that is, a white subpixel SPix.

To the plurality of detection electrodes DTL provided to the display device TPM2 according to the fourth embodiment, it is possible to apply the structure of the plurality of detection electrodes DTL described in the first embodiment. As the method of driving the plurality of driving electrodes DRL provided to the display device TPM2 according to the fourth embodiment during the input detection period, it is possible to apply the method described in the first embodiment or the second embodiment. It is also possible to detect the input position by using the self-capacitance type described in the third embodiment to the plurality of detection electrodes DTL provided to the display device TPM2 of the fourth embodiment.

In the foregoing, the invention made by the inventor of the present invention has been concretely described based on the embodiments. However, it is needless to say that the present invention is not limited to the foregoing embodiments and various modifications and alterations can be made within the scope of the present invention.

For example, in the first to fourth embodiments described above, the aspect in which each of the plurality of detection electrodes DTL is formed so as to extend along the Y axis direction has been representatively described; however, there are various modifications in the direction of extending of the detection electrode DTL. For example, the plurality of detection electrodes DTL may also extend along the X axis direction.

In the above-described embodiments, as a disclosed example, a case of the liquid crystal display device has been exemplified; however, as a different application example, it is also applicable to all sorts of flat-panel type display devices such as an organic EL display device, other light-emitting type display device, and an electronic paper type display device having an electrophoretic element. It is also needless to say that it is applicable from a small and medium size to a large size without any limitation in particular.

Various modifications and alterations can be conceived by those skilled in the art within the spirit of the present invention, and it is understood that such modifications and alterations are also encompassed within the scope of the present invention.

For example, those skilled in the art can suitably modify the above-described embodiment by addition, deletion, or design change of components, or by addition, omission, or condition change of steps.

Such modifications are also encompassed within the scope of the present invention as long as they include the gist of the present invention.

The present invention is advantageous when being applied to an input device and a display device provided with an input detection function.

What is claimed is:

1. An input device comprising:
a plurality of first electrodes each extending in a first direction and arrayed along a second direction crossing the first direction at a first separation distance;
a detection unit configured to detect an output signal based on electrostatic capacitance of each of the plurality of first electrodes;
a plurality of second electrodes arrayed along the first direction so as to overlap and respectively cross the first electrodes in a plan view; and
a driving unit configured to supply a driving signal to the second electrodes,
wherein
each of the plurality of first electrodes includes:
a plurality of electrode portions each extending along the first direction and arrayed along the second direction at a second separation distance;
a first joining portion connecting the plurality of electrode portions with each other; and
a wiring portion connecting to the first joining portion,
the first separation distance is smaller than the second separation distance,
each of the plurality of electrode portions has a first width along the second direction,
the wiring portion has a second width along the second direction,
the first width is narrower than the second width,
each of the second electrodes is not divided into a plurality of electrode portions,
the driving unit repeatedly executes a first driving operation in which the driving signal is selectively supplied to each of a subset of the second electrodes that are adjacent to each other along the first direction, the detection unit detects an output signal based on electrostatic capacitance between each of the first electrodes and those of the second electrodes in the subset of the second electrodes to which the driving signal is selectively supplied, the driving unit repeats the first driving operation multiple times by shifting a range of the second electrodes that are selected as the subset of the second electrodes by a shifting amount of one or more of the second electrodes along the first direction in order, the number of the second electrodes in the subset of the second electrodes that are selected in the first driving operation is larger than the shifting amount, and the equation N1=L×n+(M−L) is satisfied, where N1 is the total number of the second electrodes, M is the number of the second electrodes in the subset of the second electrodes that are selected in each of the first driving operations, L is the shifting amount of the second electrodes, and n is a natural number.

2. The input device according to claim 1, wherein the first separation distance is greater than or equal to the first width.

3. The input device according to claim 2, wherein the first separation distance is greater than or equal to three fifth of the second separation distance.

4. The input device according to claim 1, wherein the first separation distance is greater than or equal to one fifth and smaller than or equal to a half of the second separation distance.

5. The input device according to claim 1, wherein the first separation distance is smaller than or equal to 1 mm.

6. The input device according to claim 1, wherein the plurality of electrode portions of each of the first electrodes includes three or more electrode portions.

7. The input device according to claim 1, wherein the plurality of electrode portions of each of the first electrodes are connected to each other only at an end in the first direction.

8. The input device according to claim 1, wherein each of the plurality of first electrodes further includes a second joining portion disposed on an opposite side of the first joining portion along the first direction and configured to connect the plurality of electrode portions to each other.

9. A display device comprising:
a first substrate;
a pixel group constituted of a plurality of pixels provided to the first substrate;
a plurality of first electrodes each overlapping with the pixel group in a plan view; and
a detection unit configured to detect an output signal based on electrostatic capacitance of each of the plurality of first electrodes,
a plurality of second electrodes arrayed along the first direction so as to overlap and respectively cross the first electrodes in a plan view; and
a driving unit configured to supply a driving signal to the second electrodes,
wherein
the plurality of first electrodes each extend in a first direction and are arrayed along a second direction crossing the first direction at a first separation distance in a plan view, each of the plurality of first electrodes includes:
a plurality of electrode portions each extending along the first direction and arrayed along the second direction at a second separation distance;
a first joining portion connecting the plurality of electrode portions with each other, and
a wiring portion connecting to the first joining portion, each of the plurality of electrode portions connected to the first joining portion is arrayed along the second direction at the second separation distance in a plan view, the first separation distance is smaller than the second separation distance, each of the plurality of electrode portions has a first width along the second direction, the wiring portion has a second width along the second direction, the first width is narrower than the second width, each of the second electrodes is not divided into a plurality of electrode portions, the driving unit repeatedly executes a first driving operation in which the driving signal is selectively supplied to each of a subset of the second electrodes that are adjacent to each other along the first direction, the detection unit detects an output signal based on electrostatic capacitance between each of the first electrodes and those of the second electrodes in the subset of the second electrodes to which the driving signal is selectively supplied, the driving unit repeats the first driving operation multiple times by shifting a range of the second electrodes that are selected as the subset of the second electrodes by a shifting amount of one or more of the second electrodes along the first direction in order, the number of the second electrodes in the subset of the second electrodes that are selected in the first driving operation is larger than the shifting amount, and the equation N1=L×n+(M−L) is satisfied, where N1 is the total number of the second electrodes, M is the number of the second electrodes in the subset of the second electrodes that are selected in each of the first driving operations, L is the shifting amount of the second electrodes, and n is a natural number.

10. The display device according to claim 9, wherein the first separation distance is greater than or equal to the first width.

11. The display device according to claim 10, wherein the first separation distance is smaller than or equal to three fifth of the second separation distance.

12. The display device according to claim 9, wherein the first separation distance is greater than or equal to one fifth and is smaller than or equal to a half of the second separation distance.

13. The display device according to claim 9, wherein the first separation distance is smaller than or equal to 1 mm.

14. The display device according to claim 9, wherein the plurality of electrode portions of each of the first electrodes includes three or more electrode portions.

15. The display device according to claim 9, wherein the plurality of electrode portions of each of the first electrodes are connected to each other only at an end in the first direction.

16. The display device according to claim 9, wherein each of the plurality of first electrodes further includes a second joining portion disposed on an opposite side of the first joining portion along the first direction and configured to connect the plurality of electrode portions to each other.

\* \* \* \* \*